US012706630B2

(12) United States Patent
Kim et al.

(10) Patent No.: US 12,706,630 B2
(45) Date of Patent: Aug. 11, 2026

(54) ANTENNA AND ELECTRONIC DEVICE INCLUDING SAME

(71) Applicant: SAMSUNG ELECTRONICS CO., LTD., Suwon-si (KR)

(72) Inventors: Jaehyung Kim, Suwon-si (KR); Cheolhong Son, Suwon-si (KR); Seunghwan Kim, Suwon-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 18/657,181

(22) Filed: May 7, 2024

(65) Prior Publication Data

US 2024/0333331 A1 Oct. 3, 2024

Related U.S. Application Data

(63) Continuation of application No. PCT/KR2024/003717, filed on Mar. 25, 2024.

(30) Foreign Application Priority Data

Mar. 27, 2023 (KR) ........................ 10-2023-0039693
Apr. 19, 2023 (KR) ........................ 10-2023-0051219

(51) Int. Cl.
*H01Q 1/24* (2006.01)
*H01Q 5/50* (2015.01)
*H04B 1/40* (2015.01)

(52) U.S. Cl.
CPC ................. *H04B 1/40* (2013.01); *H01Q 5/50* (2015.01); *H01Q 1/241* (2013.01)

(58) Field of Classification Search
CPC .......... H01Q 1/24; H01Q 1/241; H01Q 1/243; H01Q 1/38; H01Q 1/42; H01Q 5/50;
(Continued)

(56) References Cited

U.S. PATENT DOCUMENTS 8,233,950 B2 * 7/2012 Hobson ................ H01Q 9/0421 343/714
9,466,884 B2 * 10/2016 Pu .......................... H01Q 13/06
(Continued)

FOREIGN PATENT DOCUMENTS

KR 10-2016-0094791 8/2016
KR 10-2017-0013677 2/2017
(Continued)

OTHER PUBLICATIONS

Search Report and Written Opinion dated Jun. 21, 2024 issued in International Patent Application No. PCT/KR2024/003717.
(Continued)

*Primary Examiner* — Thai Pham
(74) *Attorney, Agent, or Firm* — Nixon & Vanderhye P.C.

(57) ABSTRACT

According to various embodiments, an electronic device may include: a housing comprising a conductive portion and non-conductive portion forming a portion of an exterior side surface, a circuit board disposed in the housing, a communication circuit disposed on the circuit board, and a connection circuit board electrically connecting the communication circuit to the conductive portion, wherein the connection circuit board may comprise a first layer including a conductive area and a non-conductive area, the non-conductive area being located within a proximity of the non-conductive portion, and the communication circuit may be configured to transmit or receive signals via the conductive portion.

18 Claims, 30 Drawing Sheets

(58) Field of Classification Search
CPC ........ H01Q 9/42; H04M 1/02; H04M 1/0274; H04M 1/0277
See application file for complete search history.

(56) References Cited

U.S. PATENT DOCUMENTS

| | | | | |
|---|---|---|---|---|
| 2008/0165064 | A1 | 7/2008 | Hill et al. | |
| 2016/0226132 | A1 | 8/2016 | Kim et al. | |
| 2017/0033441 | A1 | 2/2017 | Son et al. | |
| 2017/0141820 | A1 | 5/2017 | Kim et al. | |
| 2017/0142241 | A1 | 5/2017 | Kim et al. | |
| 2017/0302771 | A1* | 10/2017 | Kim | H01Q 9/42 |
| 2017/0358847 | A1* | 12/2017 | Cho | H01Q 1/243 |
| 2020/0028949 | A1* | 1/2020 | Kim | H01Q 1/38 |
| 2021/0274646 | A1* | 9/2021 | Jung | H01Q 1/243 |
| 2021/0359392 | A1 | 11/2021 | Won | |
| 2022/0037791 | A1 | 2/2022 | Li | |
| 2022/0124913 | A1 | 4/2022 | Kwak et al. | |
| 2022/0376386 | A1 | 11/2022 | Lee | |
| 2022/0384934 | A1* | 12/2022 | Son | H01Q 1/38 |
| 2023/0155610 | A1* | 5/2023 | Lee | H05K 1/0215 455/575.7 |

FOREIGN PATENT DOCUMENTS

| | | | |
|---|---|---|---|
| KR | 10-2017-0056246 | | 5/2017 |
| KR | 10-2017-0119392 | | 10/2017 |
| KR | 10-2021-0110943 | | 9/2021 |
| KR | 10-2022-0051950 | A | 4/2022 |
| KR | 20220079218 | A | 6/2022 |
| KR | 20220115200 | A | 8/2022 |
| KR | 20230003540 | A | 1/2023 |
| WO | 2022173217 | A2 | 8/2022 |

OTHER PUBLICATIONS

Extended EP Search Report dated Mar. 12, 2026 issued in European Patent Application No. 24781157.3, 10 pp.

* cited by examiner 200
205
204
230a
250
W1
W3
W2
214
207
2102
2513
211
210c
230b
210a
230
2122
203
212
208
2121
213
2101
206
2123
210
z
-z
y
-y
x
-x

FIG. 3B 200
250
210b
221
218
217
216
214
2102
210c
213
210
2123
206
2121
208
212
2101
203
2122
211
y
-x
z
-z
x
-y dB
Frequency / GHz
1101
1102
1103
0
-1
-2
-3
-4
-5
-6
-7
-8
-9
-10
2
2.2
2.4
2.6
2.8
3
3.2
3.4
3.6
3.8
4
4.2

600
620
620a
623
653
662
610
610a
613
643
652
621
6201
611
6101
622
642
661
612
300
641
671
651
313
y
z
x

ANTENNA AND ELECTRONIC DEVICE INCLUDING SAME

CROSS-REFERENCE TO RELATED APPLICATIONS

This application is a continuation of International Application No. PCT/KR2024/003717 designating the United States, filed on Mar. 25, 2024, in the Korean Intellectual Property Receiving Office and claiming priority to Korean Patent Application Nos. 10-2023-0039693, filed on Mar. 27, 2023, and 10-2023-0051219, filed on Apr. 19, 2023, in the Korean Intellectual Property Office, the disclosures of each of which are incorporated by reference herein in their entireties.

BACKGROUND

Field

The disclosure relates to an antenna and an electronic device including the same.

Description of Related Art

As the functional gap between electronic devices from each manufacturer has decreased, the electronic devices are gradually becoming slimmer in order to meet consumers' purchasing needs, and development is being conducted to increase the rigidity of the electronic devices, strengthen design aspects of the electronic devices, and differentiate the functional elements of the electronic devices. As part of this trend, electronic devices may include, among their components, one or more antennas that are to be equipped for communication. Such antennas may be implemented via metal bezels (e.g., side surface members) used as part of housings of electronic devices, and are being developed to improve radiation performance.

The above-mentioned information may be provided as a related art for the purpose of helping understanding of the disclosure. No claim or determination is made as to whether any of the foregoing may be applied as a prior art related to the disclosure.

An electronic device may include at least one housing (e.g., a housing structure) that includes a space configured to accommodate electronic components. The housing may include a side surface member used as at least a portion of the side surface of the electronic device. The side surface member may be at least partially made of a metal material (e.g., a conductive member, a conductive portion, or a conductive material) to reinforce the rigidity of the electronic device and/or to execute a predetermined function (e.g., an antenna function), and the remaining portion of the side surface member may be made of a polymer material (e.g., a non-conductive member, a non-conductive portion, or a non-conductive material) combined with the metal material. For example, the side surface member may include at least one conductive portion split by at least one non-conductive portion (e.g., a cut-off portion or a gap). The at least one conductive portion may operate as at least one antenna that operates in at least one frequency band by being electrically connected to a wireless communication circuit of the electronic device.

Electronic devices may include a foldable electronic device or a rollable electronic device in which at least two or more housings operate in a manner of being folded or slid relative to each other. These types of electronic devices may lack a conductive portion, in which a metal bezel is used as an antenna, due to the provision of a space for a hinge module for folding or a space for rolling of a flexible display. Accordingly, the electronic devices may include at least one antenna used by being electrically connected to at least one conductive portion disposed at a location (e.g., a portion of the left side surface and/or the right side surface of the electronic device) spaced apart from an internal circuit board (e.g., a main circuit board) via a connection circuit board (e.g., a flexible printed circuit board (FPCB)).

However, an antenna that uses a conductive portion spaced apart from the circuit board and connected via a connection circuit board as a radiator may have lower radiation performance compared to an antenna in which a conductive portion disposed around a circuit board of the electronic device is directly connected to the circuit board in an on-ground manner.

SUMMARY

Embodiments of the disclosure may provide an antenna which is disposed on at least a portion of a side surface and in which at least one conductive portion used as a radiator is improved in radiation performance, and an electronic device including the antenna.

Embodiments of the disclosure may provide an antenna which is disposed at a location spaced apart from a circuit board and in which a conductive portion used as a radiator is improved in radiation performance by being connected via a connection circuit board, and an electronic device including the antenna.

However, the problems to be addressed in the disclosure are not limited to the above-mentioned problems, and may be variously expanded without departing from the spirit and scope of the disclosure.

According to various example embodiments, the electronic device may include: a housing comprising a conductive portion and non-conductive portion forming an portion of an exterior side surface, a circuit board disposed in the housing, a communication circuit disposed on the circuit board, and a connection circuit board electrically connecting the communication circuit to the conductive portion, wherein the connection circuit board may comprise a first layer including a conductive area and a non-conductive area, the non-conductive area being located near the non-conductive portion, wherein the communication circuit may be configured to transmit or receive signals via the conductive portion.

An electronic device according to various example embodiments of the disclosure includes at least one conductive portion disposed at a position spaced apart from a circuit board and used as an antenna by being connected to a circuit board by a connection circuit board, and the connection circuit board includes a non-conductive area in an area corresponding to the non-conductive portion to induce an enhanced current distribution, thereby helping improve radiation performance of the antenna.

Various other effects identified directly or indirectly through this disclosure can be provided.

BRIEF DESCRIPTION OF THE DRAWINGS

In connection with the description of the drawings, the same or similar components may be denoted by the same or similar reference numerals.

The above and other aspects, features and advantages of certain embodiments of the present disclosure will be more apparent from the following detailed description, taken in conjunction with the accompanying drawings, in which:

FIGS. 3A and 3B are rear perspective views illustrating the electronic device in the slide-in state and the slide-out state, respectively according to various embodiments;

DETAILED DESCRIPTION

Figure 1:
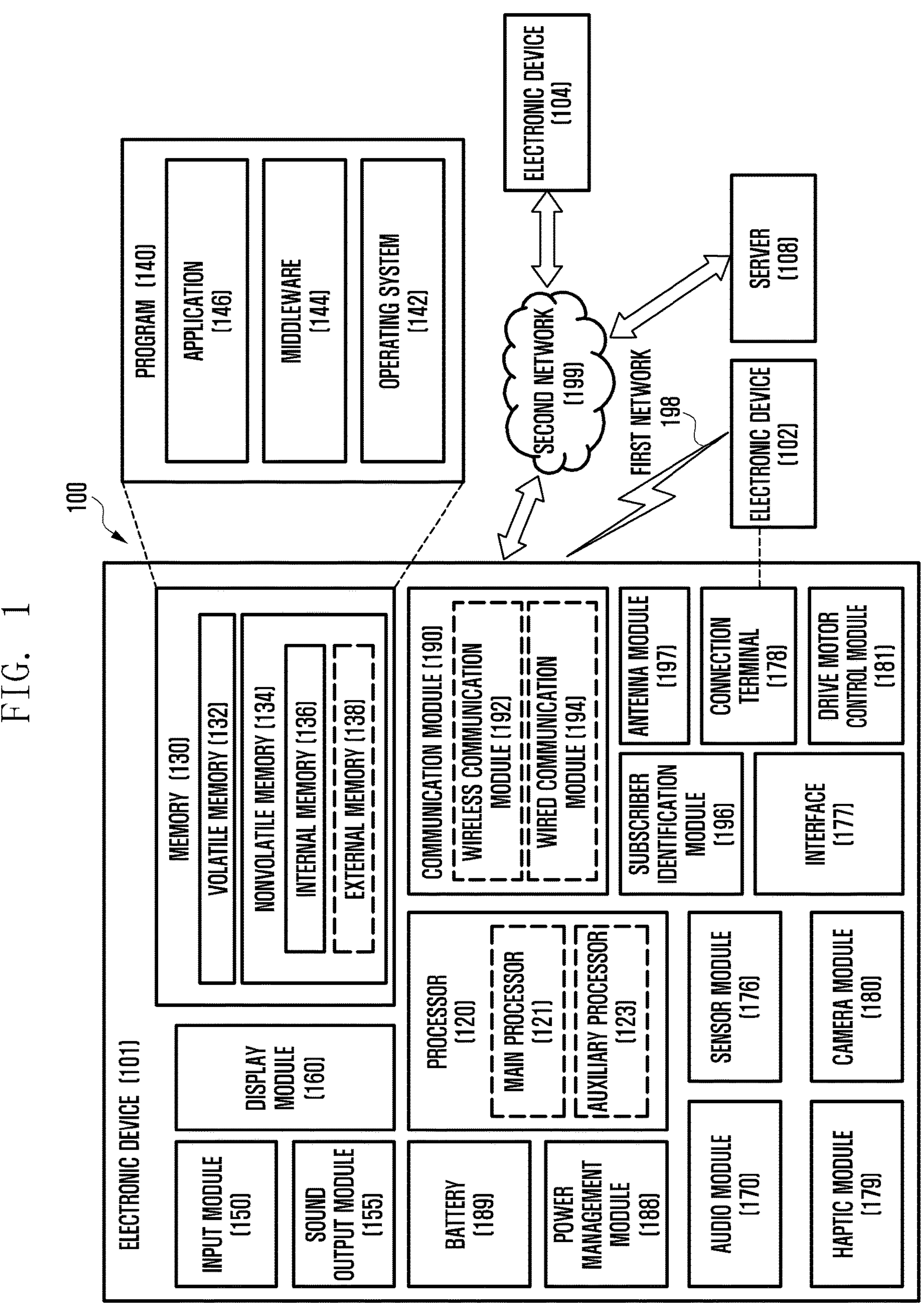
FIG. 1 is a block diagram illustrating an example electronic device in a network environment according to various embodiments.

Hereinafter, various example embodiments of the disclosure will be described in greater detail with reference to the drawings. However, the disclosure may be implemented in many different forms, and is not limited to the embodiments described herein. In connection with a description made with reference to the drawings, the same or similar reference numerals may be used for the same or similar elements. In addition, in the drawings and related descriptions, descriptions of well-known functions and configurations may be omitted for clarity and brevity.

FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. Further, the processor 120 may include various processing circuitry (as used herein, including the claims, the term "processor" may include various processing circuitry, including at least one processor, wherein one or more processors of at least one processor may be configured to perform the various functions described herein). As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. the non-volatile memory 134 may include internal memory 136 and external memory 138.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record, and the receiver may be used for incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture an image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
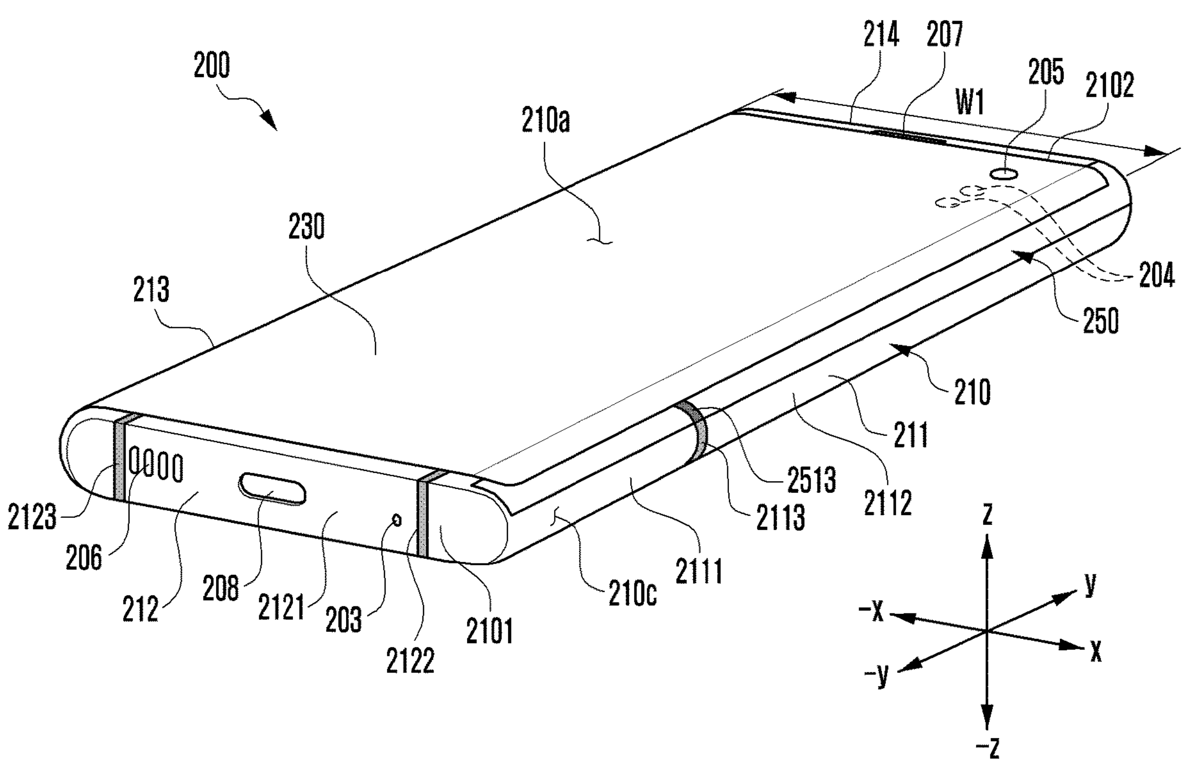
FIGS. 2A and 2B are front perspective views illustrating an electronic device in a slide-in state and a slide-out state, respectively according to various embodiments.
Figure 2B:
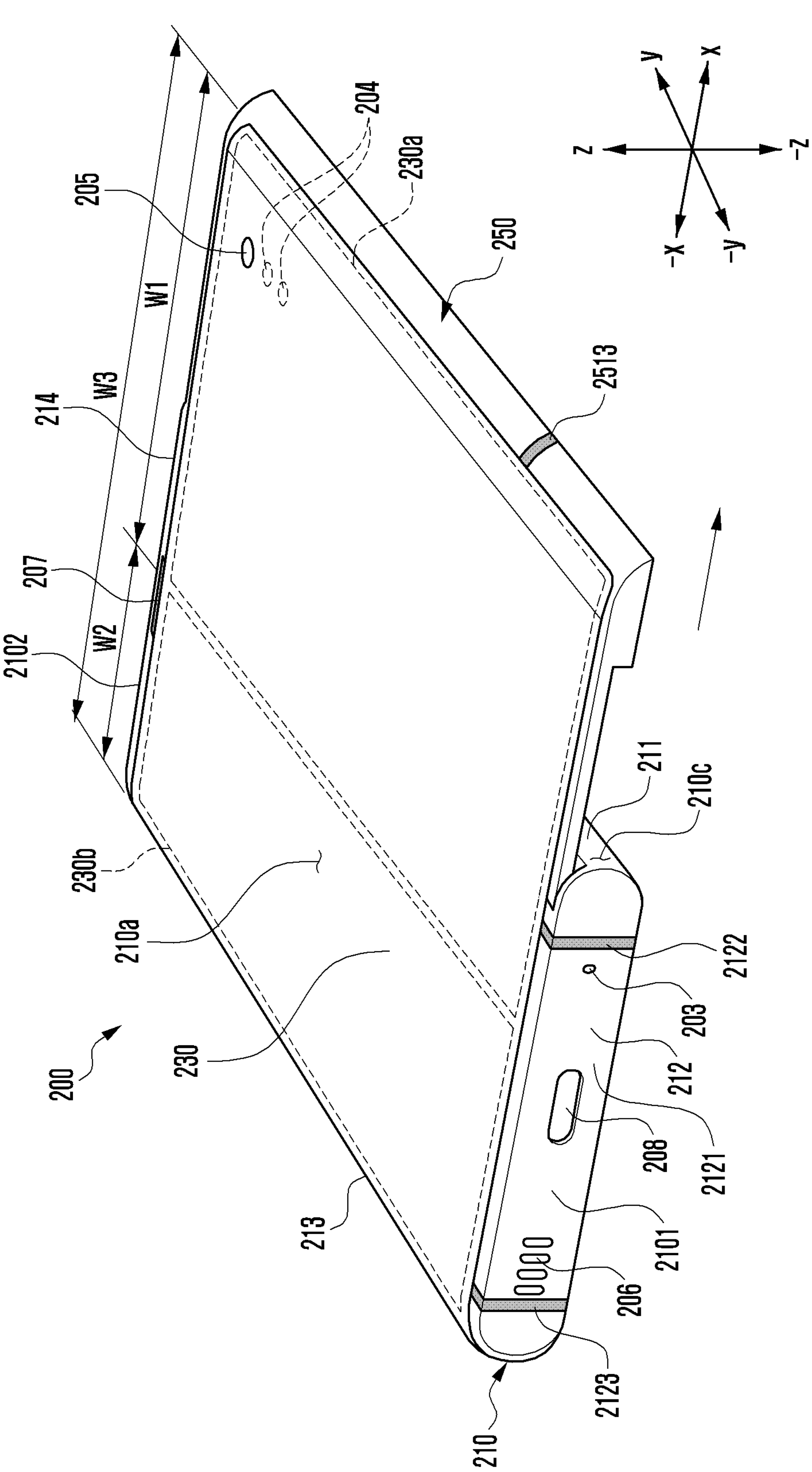
Figure 3A:
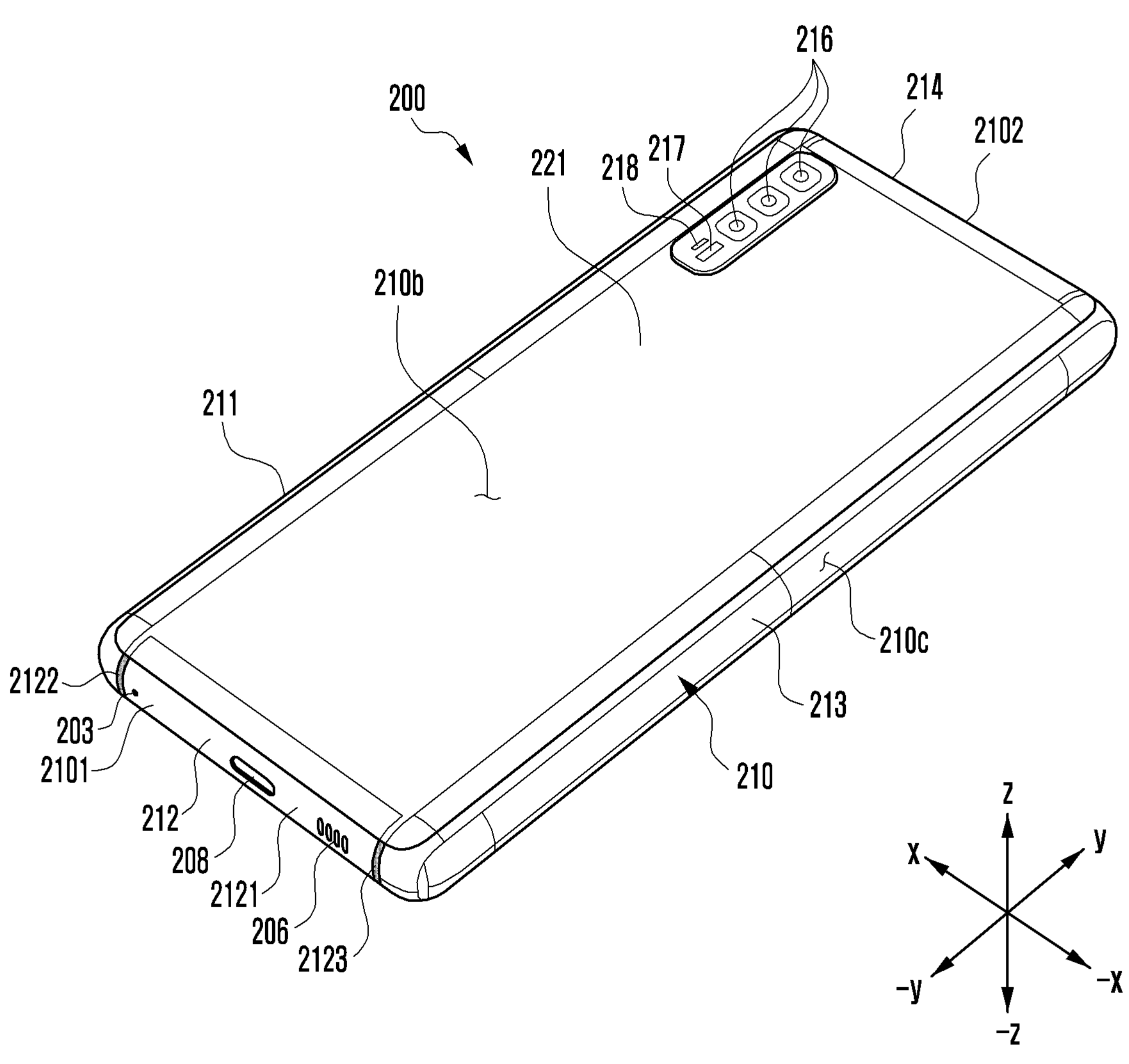
Figure 3B:
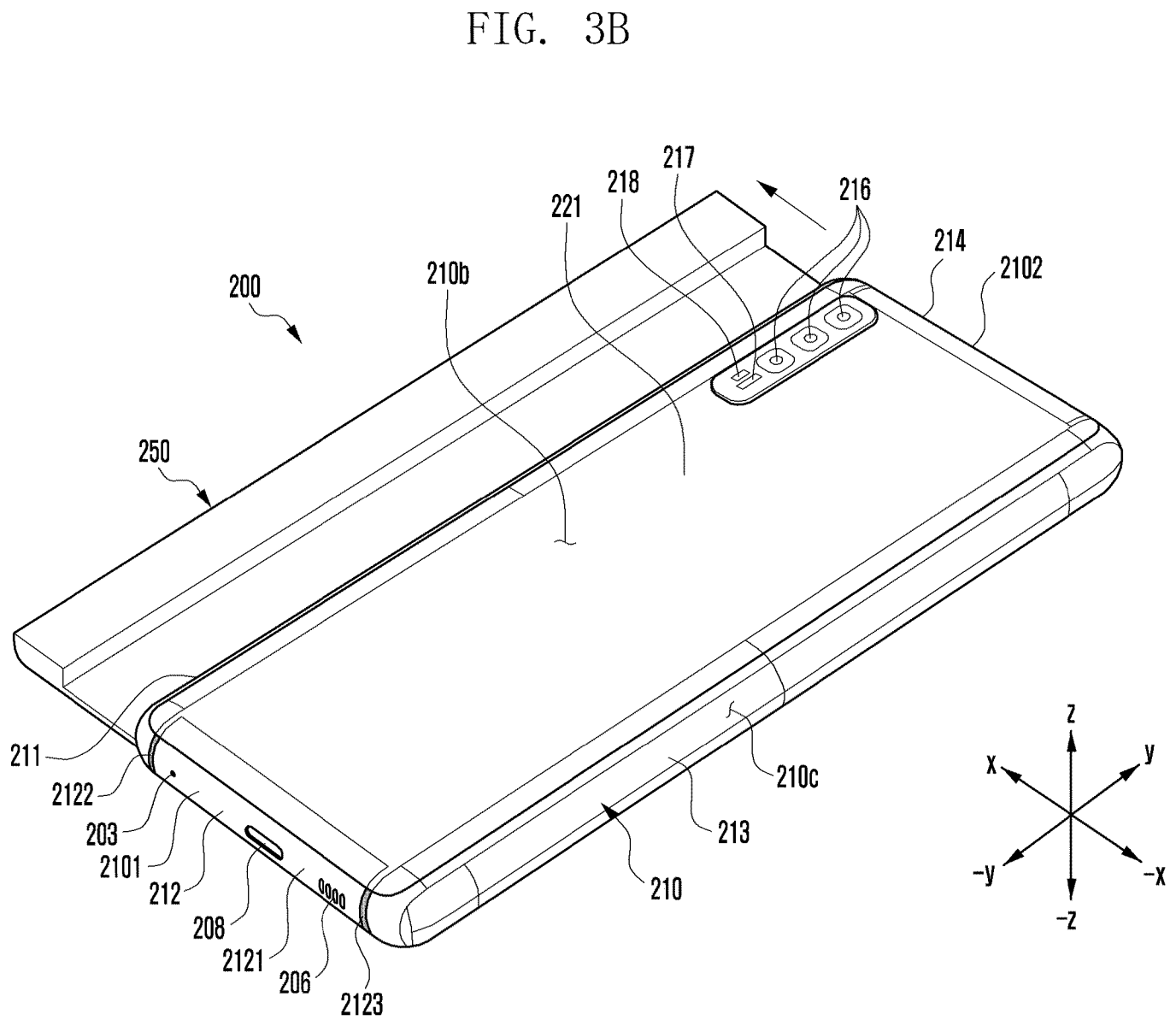

FIGS. 2A and 2B are front perspective views illustrating an example electronic device in a slide-in state and a slide-out state, respectively according to various embodiments. FIGS. 3A and 3B are rear perspective views illustrating the electronic device in the slide-in state and the slide-out state, respectively according to various embodiments.

The electronic device 200 in FIGS. 2A, 2B, 3A and 3B (which may be referred to herein as FIGS. 2A to 3B) may be at least partially similar to the electronic device 100 of FIG. 1 or may further include various embodiments of the electronic device.

Figure 4:
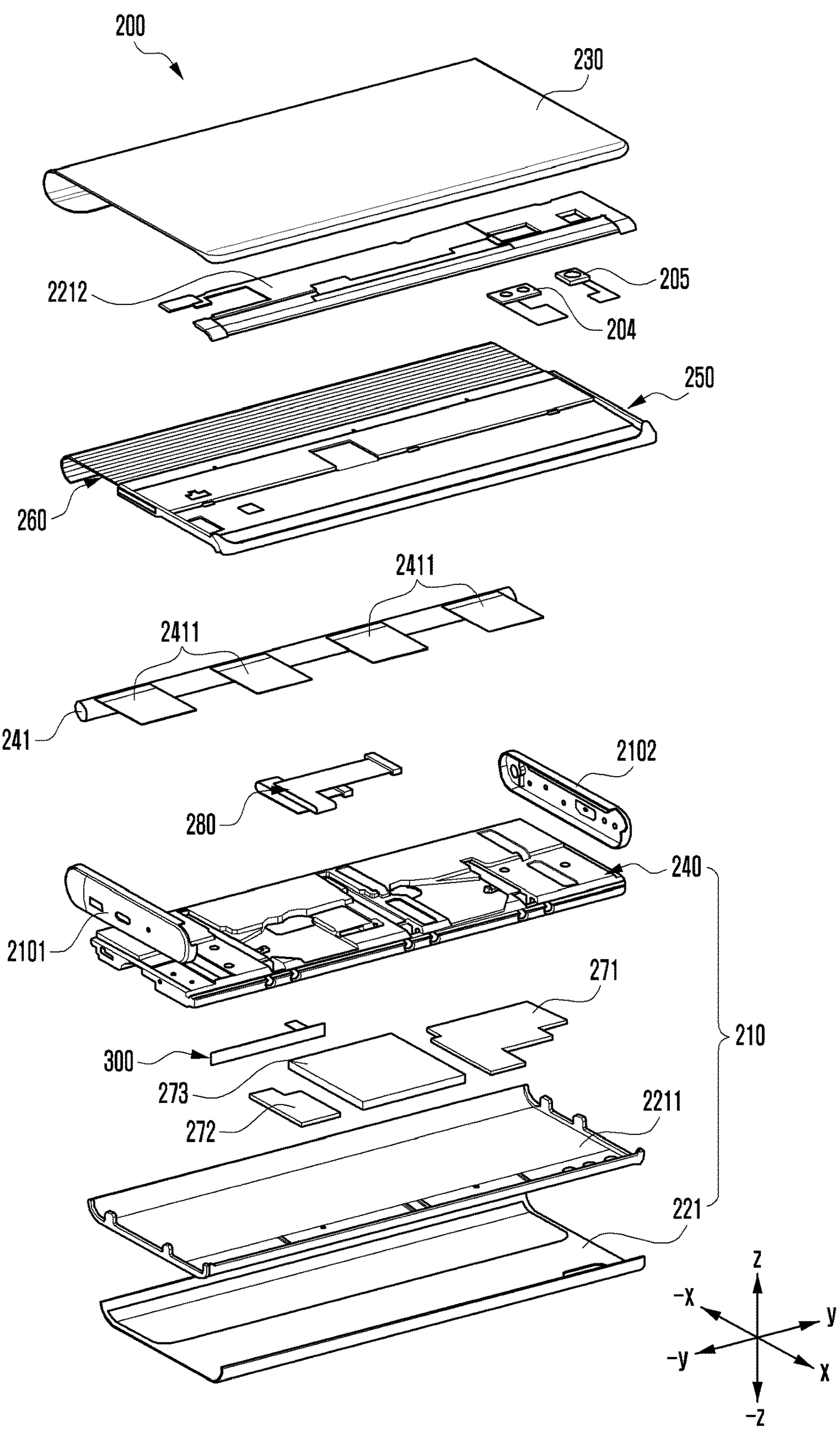
FIG. 4 is an exploded perspective view of an electronic device according to various embodiments.

Referring to FIGS. 2A to 3B, the electronic device 200 may include a housing 210 (e.g., a housing structure, a base housing, or a first housing), a slide structure 250 (e.g., a second housing) coupled to be movable in a predetermined direction (e.g., the x-axis direction) and a predetermined reciprocating distance from the housing 210, a bendable member or bendable support member (e.g., the bendable member 260 in FIG. 4) (e.g., a hinge rail or an articulated hinge module) coupled to one end of the slide structure 250 and at least partially accommodated in the inner space of the housing 210 through bending in the slide-in state, and a flexible display 230 (e.g., an expandable display) disposed to be at least partially supported by the slide structure 250 and the bendable member (e.g., the bendable member 260 in FIG. 4). In an embodiment, in the slide-in state, the flexible display 230 may be at least partially accommodated in the inner space of the housing 210 while being supported by the bendable member (e.g., the bendable member 260 in FIG. 4), thereby being disposed invisible from the outside. In an embodiment, in the slide-out state, the flexible display 230 may be disposed at least partially visible from outside while being supported by the bendable member (e.g., the bendable member 260 is FIG. 4), which defines the same plane as the slide structure 250.

According to various embodiments, the electronic device 200 may include a housing 210 (e.g., a housing structure) that includes a front surface 210*a* (e.g., a first surface) facing a first direction (e.g., the z-axis direction), a rear surface 210*b* (e.g., a second surface) facing a second direction (e.g., the −z-axis direction) opposite to the first direction, and a side surface 210*c* surrounding the space between the front surface 210*a* and the rear surface 210*b* and at least partially exposed to the outside. In an embodiment, the rear surface 210*b* may include a rear surface cover 221 included as at least a portion of the housing 210. In various embodiments, the housing 210 may be configured with at least some of a base bracket (e.g., a side surface member) (e.g., the base bracket 240 in FIG. 4) disposed in the inner space of the electronic device 200 and configured to guide the slide structure 250, one or more side surface covers 2101 and 2102 coupled to at least a portion of the base bracket (e.g., the base bracket 240 in FIG. 4), and a rear surface cover 221. In an embodiment, the rear surface cover 221 may be made of, for example, polymer, coated or colored glass, ceramic, metal (e.g., aluminum, stainless steel (STS), or magnesium), or a combination of two or more of these materials. In various embodiments, the rear surface cover 221 may extend to at least a portion of the side surface 210*c*.

According to an embodiment, the side surface 210*c* may include a first side surface 211 having a first length, a second side surface 212 extending from the first side surface 211 in a direction perpendicular to the first side surface 211 and having a second length smaller than the first length, a third side surface 213 extending from the second side surface 212 in parallel to the first side surface 211 and having the first length, and a fourth side surface 214 extending from the third side surface 213 in parallel to the second side surface 212 and having the second length. In an embodiment, the slide structure 250 may support at least a portion of the flexible display 230 and may slide out from the third side surface 213 toward the first side surface 211 (e.g., in the x-axis direction) to expand the display area of the flexible display 230, or may slide in from the first side surface 211 toward the third side surface 213 (e.g., in the −x-axis direction) to contract the display area of the flexible display 230. In an embodiment, one or more side covers 2101 and 2102 may be disposed on the second side surface 212 and the fourth side surface 214, respectively.

According to various embodiments, the electronic device 200 may include a flexible display 230 disposed to be supported by the slide structure 250. In an embodiment, the flexible display 230 may include a first area 230*a* (e.g., a flat portion) supported by the slide structure 250, and a second area 230*b* (e.g., a bendable portion) extending from the first area 230*a* and supported by the bendable member (e.g., the bendable member 260 in FIG. 4A). According to an embodiment, when the electronic device 200 is in the slide-in state, the second area 230*b* of the flexible display 230 may be slid into the inner space of the housing 210 and disposed not to be exposed to the outside, and when the electronic device 200 is in the slide-out state, the second area 230*b* may be exposed to the outside by extending from the first area 230*a* while being supported by the bendable member (e.g., the bendable member 260 in FIG. 4). Therefore, the electronic device 200 may include a rollable type electronic device and/or a slidable type electronic device in which the display area of the flexible display 230 is variable depending on the movement of the slide structure 250 from the housing 210.

According to various embodiments, the slide structure 250 may be coupled to be at least partially slid into or slid out from the housing 210. For example, in the slide-in state, the electronic device 200 may be configured to have a first width W1 from the first side surface 211 to the third side surface 213. In an embodiment, in the slide-out state, the electronic device 200 may be operated to have a third width W3 greater than the first width W1 by causing the bendable member (e.g., the bendable member 260 in FIG. 4A) slid into the housing 210 to move in a predetermined direction (e.g., the x-axis direction) to have an additional second width W2. Accordingly, in the slide-in state, the flexible display 230 may have a display area substantially corresponding to the first width W1, and in the slide-out state, the flexible display 230 may have an expanded display area substantially corresponding to the third width W3.

According to various embodiments, the slide structure 250 may be operated through a user's manipulation. For example, the electronic device 200 may be switched to the slide-in state or the slide-out state through the user's manipulation of pressing the outer surface of the flexible display 230 in a predetermined direction. In various embodiments, in the electronic device 200, the slide structure 250 may be slid out in a predetermined direction (e.g., the x-axis direction) by manipulating a button (not illustrated) of a locker (not illustrated) exposed to the outside. In this case, when the slide structure 250 is pressed in a predetermined direction (e.g., the −x axis direction), the slide structure 250 may be controlled to maintain the slide-in state by the locker (not illustrated) while holding a restoring force to be slid out by an elastic member. In various embodiments, the slide structure 250 may be automatically operated by a driving mechanism (e.g., a driving motor, a deceleration module, and/or a gear assembly) disposed in the inner space of the housing 210. In an embodiment, the electronic device 200 may be configured to control the operation of the slide structure 250 by the driving mechanism when an event for switching the electronic device 200 to the slide-in/slide-out state is detected via a processor (e.g., the processor 120 in FIG. 1). In various embodiments, the processor of the electronic device 200 (e.g., the processor 120 in FIG. 1) may control the flexible display 230 to display an object in various ways and execute an application to correspond to the display area of the flexible display 230 changed depending on the slide-in state, the slide-out state, or an intermediate state between the slide-in state and the slide-out state.

According to various embodiments, the electronic device 200 may include at least one of an input device 203, sound output devices 206 and 207, sensor modules 204 and 217, camera modules 205 and 216, a connector port 208, a key input device (not illustrated), or an indicator (not illustrated). In an embodiment, the electronic device 200 may be configured such that at least one of the above-described components is omitted or other components are additionally included.

According to various embodiments, the input device 203 may include a microphone. In various embodiments, the input device 203 may include a plurality of microphones disposed to detect the direction of sound. The sound output devices 206 and 207 may include speakers. The sound output devices 206 and 207 may include an external speaker 206 and a communication receiver 207. As an embodiment, the sound output devices 206 and 207 may include a speaker that is operated without a separate speaker hole (e.g., a piezo speaker).

According to various embodiments, the sensor modules 204 and 217 may generate electrical signals or data values corresponding to an internal operating state or an external environmental state of the electronic device 200. The sensor modules 204 and 217 may include, for example, a first sensor module 204 (e.g., a proximity sensor or an illuminance sensor) disposed on the front surface 210*a* of the electronic device 200 and/or a second sensor module 217 (e.g., a heart rate monitoring (HRM) sensor) disposed on the rear surface 210*b*. In an embodiment, the first sensor module 204 may be disposed under the flexible display 230 in the front surface 210*a* of the electronic device 200. In an embodiment, the first sensor module 204 may include at least one of a proximity sensor, an illuminance sensor, a time-of-flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to various embodiments, the camera modules 205 and 216 may include a first camera module 205 disposed on the front surface 210*a* of the electronic device 200 and a second camera module 216 disposed on the rear surface 210*b*. In an embodiment, the electronic device 200 may include a flash 218 located near the second camera module 216. In an embodiment, the camera modules 205 and 216 may include one or more lenses, an image sensor, and/or an image signal processor. In an embodiment, the first camera module 205 may be disposed under the flexible display 230 and may be configured to photograph a subject through a portion of an active area of the flexible display 230. In an embodiment, the flash 218 may include, for example, a light-emitting diode or a xenon lamp.

According to various embodiments, a camera module 205 from among the camera modules 205 and 216, a sensor module 204 from among the sensor modules 204 and 217, or an indicator may be disposed to be exposed through the flexible display 230. For example, the camera module 205, the sensor module 204, or the indicator may be disposed in the inner space of the electronic device 200 to be in contact with the external environment through a transmission area or an opening perforated in the flexible display 230. In an embodiment, the area of the flexible display 230, which faces the camera module 205, may be configured as a transmission area having a predetermined transmittance as a portion of a content display area. In an embodiment, the transmission area may have a transmittance ranging from about 5% to about 20%. The transmission area may include an area overlapping an effective area (e.g., a field of view area) of the camera module 205 through which light imaged by the image sensor to generate an image passes. For example, the transmission area of the flexible display 230 may include an area having a lower pixel density and/or a lower wire density than the surrounding area. For example, the transmission area may replace the above-mentioned opening. For example, the camera module 205 may include an under-display camera (UDC). In an embodiment, the sensor module 204 may be disposed to execute its function in the inner space of the electronic device 200 without being visually exposed through the flexible display 230.

According to various embodiments, at least a portion of the side surface 210*c* of the electronic device 200 may include a housing 210 made of a conductive material (e.g., a metal material). In an embodiment, the housing 210 may include a first conductive portion 2111 that includes a portion of the first side surface 211 and a portion of the second side surface 212. In an embodiment, the first conductive portion 2111 may be provided by a first non-conductive portion 2113 (e.g., a first cut-off portion or a first gap) disposed on the first side surface 211 and a second non-conductive portion 2122 (e.g., a second cut-off portion or a second gap) disposed on the second side surface 212. In an embodiment, the electronic device 200 may include a second conductive portion 2112 provided in the first side surface 211 by the first non-conductive portion 2113. In an embodiment, the electronic device 200 may include a third conductive portion 2121 (e.g., a third cut-off portion or a third non-conductive portion) split by the second non-conductive portion 2122 and the third non-conductive portion 2123 disposed on the second side surface 212. In an embodiment, the electronic device 200 may include an antenna using the first conductive portion 2111. In an embodiment, the first conductive portion 2111 may be electrically connected to a first circuit board (e.g., the first circuit board 271 in FIG. 4) disposed in the inner space of the housing 210 at a position spaced apart from the first conductive portion 2111 and connected to a wireless communication circuit (e.g., the wireless communication module 192 in FIG. 1). In an embodiment, the wireless communication circuit 192 may be configured to transmit or receive RF signals in a predetermined frequency band (e.g., at least one of legacy band, sub-6 band, or NR band) via the first conductive portion 2111. In an embodiment, the connection circuit board 300 may include a flexible circuit board (e.g., a flexible printed circuit board (FPCB)) or a flexible RF cable (FRC). In an embodiment, the connection circuit board 300 may electrically interconnect the wireless communication circuit 192 of the first circuit board 271 and at least a portion of the first conductive portion 2111. In an embodiment, the connection circuit board 300 may generally extend from the first circuit board 271 disposed on the upper side (e.g., in the y-axis direction) in the inner space of the housing 210 to at least a portion of the first conductive portion 2111. In an embodiment, a portion of the connection circuit board 300 may be connected to the first circuit board 271 via a connector, and another portion may be disposed in at least a portion of the first conductive portion 2111 to be in physical contact with at least a portion of the first conductive portion 2111. In an embodiment, the connection circuit board 300 may be disposed in the inner space of the housing 210 to extend from a position adjacent to the first side surface 211 and may pass through an area corresponding to the first non-conductive portion 2113. In various embodiments, the third conductive portion 2121 may be operated as another antenna by being electrically connected to a second circuit board (e.g., the second circuit board 272 in FIG. 4) spaced apart from the first circuit board 271. In this case, the second circuit board 272 may be electrically connected to the wireless communication circuit 192 of the first circuit board or may include another wireless communication circuit.

According to an example embodiment of the disclosure, the connection circuit board 300 may include a non-conductive area (e.g., the non-conductive area 313 in FIG. 5B) (e.g., a fill-cut off area) in an area corresponding to or adjacent to the first non-conductive portion 2113. In an embodiment, an enhanced current distribution (E-field) is induced near the first non-conductive portion 2113 through the non-conductive area 313, so that the first conductive portion 2111 can help improve radiation performance of the antenna.

According to an example embodiment of the disclosure, the electronic device 200 may include a fourth non-conductive portion 2513 (e.g., a fourth cut-off portion or a fourth gap) disposed on the slide structure 250 made of a conductive material. In an embodiment, the fourth non-conductive portion 2513 may be disposed at a position that corresponds to (e.g., coincides with) the first non-conductive portion 2113 when the electronic device 200 is in the slide-in state, thereby helping exhibit uniform radiation performance of the antenna using the first conductive portion 2111 regardless whether the electronic device is in the slide-in state and the slide-out state. In an embodiment, the above-described non-conductive portions 2113, 2122, 2123, and 2513 may comprise a polymer, and may be coupled, through injection molding or structurally, with the housing 210 and/or slide structure 250 made of a conductive material. In various embodiments, at least one of the non-conductive portions 2113, 2122, 2123, and 2513 and/or at least one of the conductive portions 2111, 2112, and 2121 may be disposed visible from the outside by being provided in the side surface covers 2101 and 2102 and the rear surface cover 221 as a portion of the housing 210. In various embodiments, at least one of the non-conductive portions 2113, 2122, 2123, and 2513 and/or at least one of the conductive portions 2111, 2112, and 2121 may be disposed invisible from the outside by being provided in the base bracket (e.g., the base bracket 240 in FIG. 4) (e.g., a side surface member) disposed in the inner space of the housing 210 as a portion of the housing 210.

FIG. 4 is an exploded perspective view of an electronic device according to various embodiments.

Referring to FIG. 4, the electronic device 200 may include a housing 210, a slide structure 250 coupled to be slidable from the housing 210, a bendable member 260 disposed to move together with the slide structure 250, and a flexible display 230 disposed to be supported by the slide structure 250 and the bendable member 260. In an embodiment, the housing 210 may include a base bracket 240, a cover member 221 (e.g., a rear surface cover) fixed to at least a portion of the base bracket 240, and one or more side surface covers 2101 and 2102 surrounding at least a portion of the inner space (e.g., the space 2103 in FIG. 5A) between the base bracket 240 and the cover member 221.

According to various embodiments, the electronic device 200 may include a guide roller 241 rotatably disposed on the base bracket 240. In an embodiment, the guide roller 241 may support at least a portion of the bendable member 260 connected to the slide structure 250. In an embodiment, the electronic device 200 may include at least one tension belt 2411 supported by the guide roller 241 or disposed near the guide roller 241 and configured to support the bendable member 260 to prevent and/or reduce the bendable member 260 from sagging. In an embodiment, the electronic device 200 may include at least one support bracket 2211 (e.g., a rear case) disposed between the base bracket 240 and the cover member 221 and configured to provide rigidity to the electronic device 200 or provide a space for mounting components.

According to various embodiments, the electronic device 200 may include a support cover 2212 coupled with at least a portion of the slide structure 250 to provide a flat surface for supporting the flexible display 230. In this case, the space between the support cover 2212 and the slide structure 250 may be used as an arrangement space for the camera module 205 and/or the sensor module 204 disposed under the flexible display 230 to detect the external environment through at least a portion of the flexible display 230.

Figure 5A:
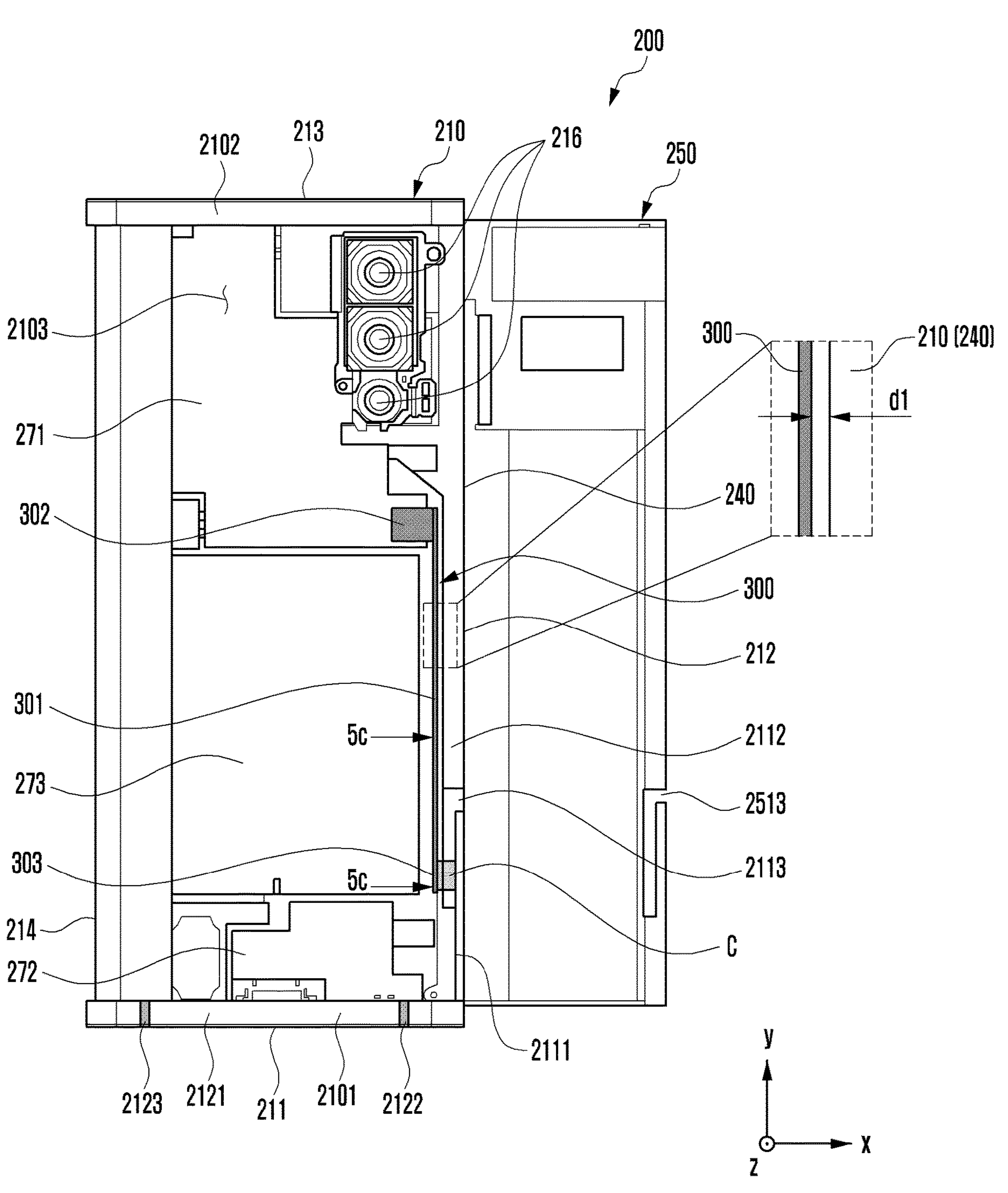
FIG. 5A is a diagram illustrating an electronic device including a conductive portion electrically connected to a circuit board via a connection circuit board according to various embodiments.

According to various embodiments, the electronic device 200 may include at least one electrical structure disposed in the inner space of the housing 210 (e.g., the inner space 2103 in FIG. 5A). In an embodiment, the at least one electrical structure may include one or more circuit boards 271 and 272, and a slide FPCB 280 that electrically connects the battery 273, and/or the flexible display 230 to the one or more circuit boards 271 and 273. In an embodiment, the one or more circuit boards 271 and 272 may include a first circuit board 271 disposed on one side (e.g., the upper side, the y-axis direction) and a second circuit board 272 disposed on the other side (e.g., the lower side, the −y-axis direction). In an embodiment, the flexible circuit board 280 may have one end electrically connected to the first circuit board 271 and/or the second circuit board 272 and the other end electrically connected to the flexible display 230, and may be configured to have a shape and a length for accommodating a slidable reciprocating distance (a reciprocating stroke) of the slide structure 250.

According to various embodiments, the electronic device 200 may include a connection circuit board 300 configured to electrically connect the first circuit board 271 to a conductive portion (e.g., the first conductive portion 2111 in FIG. 2A) of the housing 210 in the inner space (e.g., the inner space 2103 in FIG. 5A) of the housing 210. In an embodiment, the connection circuit board 300 may electrically connect the wireless communication circuit (e.g., the wireless communication module 192 in FIG. 1) of the first circuit board 271 to the conductive portion 2111 used as a radiator.

According to an example embodiment of the disclosure, the connection circuit board 300 may include a non-conductive area (e.g., the non-conductive area 313 in FIG. 5B) corresponding to or adjacent to a non-conductive portion (e.g., the first non-conductive portion 2113 in FIG. 2A) that electrically splits the conductive portion 2111 from the surrounding conductive material is omitted. In an embodiment, an enhanced current distribution (E-field) is induced near the non-conductive portion 2113 through the non-conductive area 313, so that the conductive portion 2111 can help improve radiation performance of the antenna.

Figure 5B:
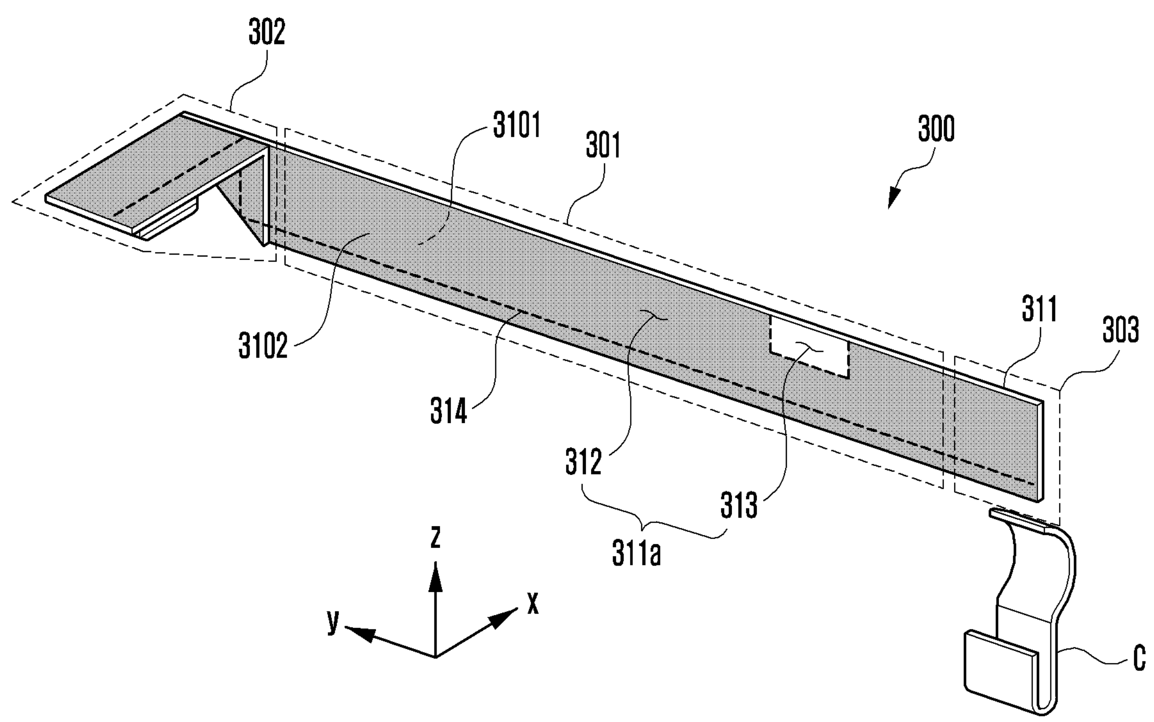
FIG. 5B is a perspective view illustrating the connection circuit board according to various embodiments.

FIG. 5A is a diagram illustrating an electronic device including a conductive portion electrically connected to a circuit board via a connection circuit board according to various embodiments. FIG. 5B is a perspective view of the connection circuit board according to various embodiments.

In describing the electronic device 200 of FIG. 5A, the same reference numerals are assigned to substantially the same components as those of the electronic device 200 of FIGS. 2A to 3B, and a detailed description thereof may not be repeated.

Referring to FIG. 5A, the electronic device 200 may include a housing 210, a slide structure 250 coupled to be movable from the housing 210 in a predetermined direction (e.g., x-axis direction), a bendable member (e.g., the bendable member 260 in FIG. 4) coupled to one end of the slide structure 250 and at least partially accommodated in the inner space 2103 of the housing 210 by being bent in the slide-in state, and a flexible display 230 disposed to be at least partially supported by the slide structure 250 and the bendable member 260.

According to various embodiments, the electronic device 200 may include a first circuit board 271 disposed in the inner space 2103 and a second circuit board 272 spaced apart from the first circuit board 271. In an embodiment, the electronic device 200 may include a battery 273 disposed in the inner space 2103. In an embodiment, the electronic device 200 may include a first conductive portion 2111 disposed at a position spaced apart from the first circuit board 271 and split by the first non-conductive portion 2113 and the second non-conductive portion 2122 in a side surface (e.g., the side surface 210*c* in FIG. 2A) of the housing 210. In an embodiment, the first conductive portion 2111 may be configured with a portion of the first side surface 211 and a portion of the second side surface 212. In various embodiments, the first conductive portion 2111 may be configured with only a portion of the first side surface 211. In various embodiments, the first conductive portion 2111 may be provided on one of the first side surface 211, the second side surface 212, the third side surface 213, and the fourth side surface 214.

According to various embodiments, the electronic device 200 may include a connection circuit board 300 that electrically connects the first circuit board 271 to at least a portion of the first conductive portion 2111 in the inner space 2103 of the housing 210. In an embodiment, the connection circuit board 300 may include a first surface 3101 facing a first direction (e.g., the x-axis direction) and a second surface 3102 facing a second direction (e.g., the x-axis direction) opposite to the first direction with reference to a relatively wide surface. In an embodiment, the connection circuit board 300 may include an extension 301, a first connection portion 302 disposed on one side of the extension 301 and electrically connected to the first circuit board 271, and a second connection portion 303 disposed on the other side and electrically connected to the first conductive portion 2111. In an embodiment, the connection circuit board 300 may include a dielectric substrate 311 fabricated by stacking a plurality of insulating layers. In an embodiment, the connection circuit board 300 may include a conductive area 312 and a non-conductive area 313 provided in a first layer 311*a* among the plurality of insulating layers. In an embodiment, the connection circuit board 300 may include at least one signal line 314 provided on at least one insulating layer different from the first layer 311*a*. For example, the at least one signal line 314 may transmit an RF signal. In an embodiment, the at least one signal line may transmit a data signal. In an embodiment, the conductive area 312 may be at least one ground layer of the connection circuit board 300. In an embodiment, the non-conductive area 313 may be an area in which at least a portion of the ground layer is omitted (or removed). In an embodiment, the signal line 314 (e.g., a transmission line or a feeding line) may be disposed between a plurality of ground layers or in a portion of the conductive area 312 in the first layer 311*a*.

In various embodiments, in the connection circuit board 300, the extension 301 may extend in the inner space 2103 of the housing 210 while facing or corresponding to the first side surface 211. For example, in the connection circuit board 300, the extension 301 may extend between the battery 273 and the first side surface 211 in the inner space 2103 of the housing 210 and may be electrically connected to a portion of the first conductive portion 2111 through the first non-conductive portion 2113. In an embodiment, the connection circuit board 300 may be disposed in the inner space 2103 of the housing 210 such that the first surface 3101 thereof faces the first side surface 211. In an embodiment, the non-conductive area 313 provided in the extension 301 of the connection circuit board 300 may be disposed at a position corresponding to the first non-conductive portion 2113. In various embodiments, the extension 301 of the connection circuit board 300 may be disposed to at least partially overlap the battery 273 when viewed in the z-axis direction. In an embodiment, the first connection portion 302 of the connection circuit board 300 may include a connector and may be electrically connected to a wireless communication circuit (e.g., the wireless communication circuit 192 in FIG. 1) by being connected to a receptacle disposed on the first circuit board 271. In an embodiment, the second connection portion 303 of the connection circuit board 300 may be electrically connected to the first conductive portion 2111 in the inner space 2103 of the housing 210 via a conductive contact C (e.g., a conductive C-clip or a conductive tape). In an embodiment, the first non-conductive portion 2113 may be provided on the first side surface 211 in a split shape in the longitudinal direction (e.g., y-axis direction). For example, the second connection portion 303 may be electrically connected to the first conductive portion 2111 across the first non-conductive portion 2113. In an embodiment, the first surface 3101 of the connection circuit board 300 may be disposed in the inner space 2103 of the housing 210 within a predetermined separation distance d1 from the first side surface 211 (e.g., the inner side surface of the first side surface 211). For example, the connection circuit board 300 may be disposed such that the separation distance d1 between the first surface 3101 and the first side surface 211 ranges from about 0 mm to 5 mm.

Figure 5C:
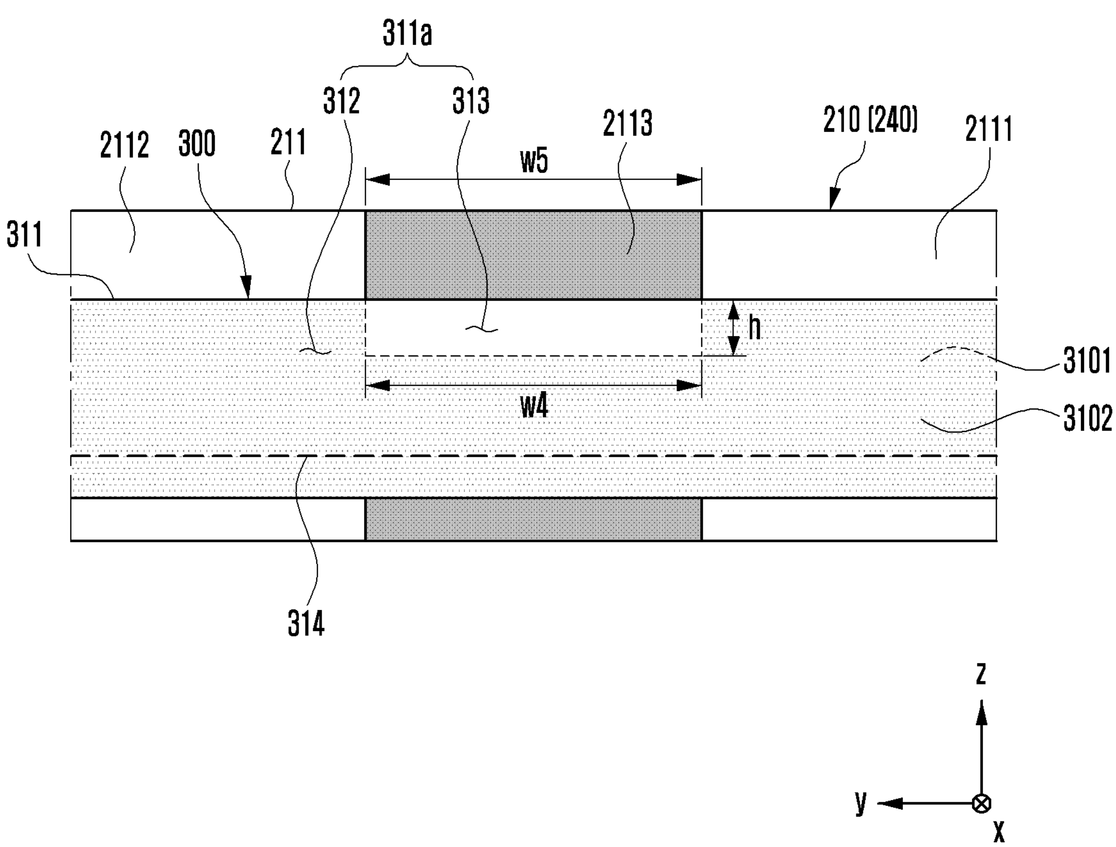
FIG. 5C is a diagram illustrating an arrangement relationship between the connection circuit board and the housing viewed in a direction of line 5*c*-5*c* in FIG. 5A according to various embodiments.

FIG. 5C is a diagram illustrating an arrangement relationship between the connection circuit board and the housing viewed in the direction of line 5*c*-5*c* in FIG. 5A according to various embodiments. FIG. 5C is a view of the extension of the connection circuit board viewed in the x-axis direction in the inner space of the housing.

Referring to FIG. 5C, when the connection circuit board 300 is viewed in the –x axis direction (e.g., when the first side surface 211 is viewed from the outside or when the first non-conductive portion 2113 is viewed from the outside), the non-conductive area 313 may be disposed to at least partially overlap the first non-conductive portion 2113. In an embodiment, the non-conductive area 313 may have a predetermined width w4 and depth h. In an embodiment, the width w4 of the non-conductive area 313 may be greater than the depth h. In various embodiments, the width w4 of the non-conductive area 313 may be equal to or smaller than the depth h. In an embodiment, the width w4 of the non-conductive area 313 may substantially coincide with the width w5 of the first non-conductive portion 2113. In this case, the connection circuit board 300 may be disposed such that the non-conductive area 313 overlaps the first non-conductive portion 2113 in the width direction (e.g., the y-axis direction). In an embodiment, the width w4 of the non-conductive area 313 may be smaller or larger than the width w5 of the first non-conductive portion 2113. In various embodiments, the non-conductive area 313 may be disposed near the first non-conductive portion 2113 not to overlap the first non-conductive portion 2113. In this case, the non-conductive area 3113 may be disposed to have the shortest distance within about 3 mm from the first non-conductive portion 2113, thereby helping induce an enhanced current distribution near the first non-conductive portion 2113 when the first conductive portion 2111 operates as an antenna.

Figure 5D:
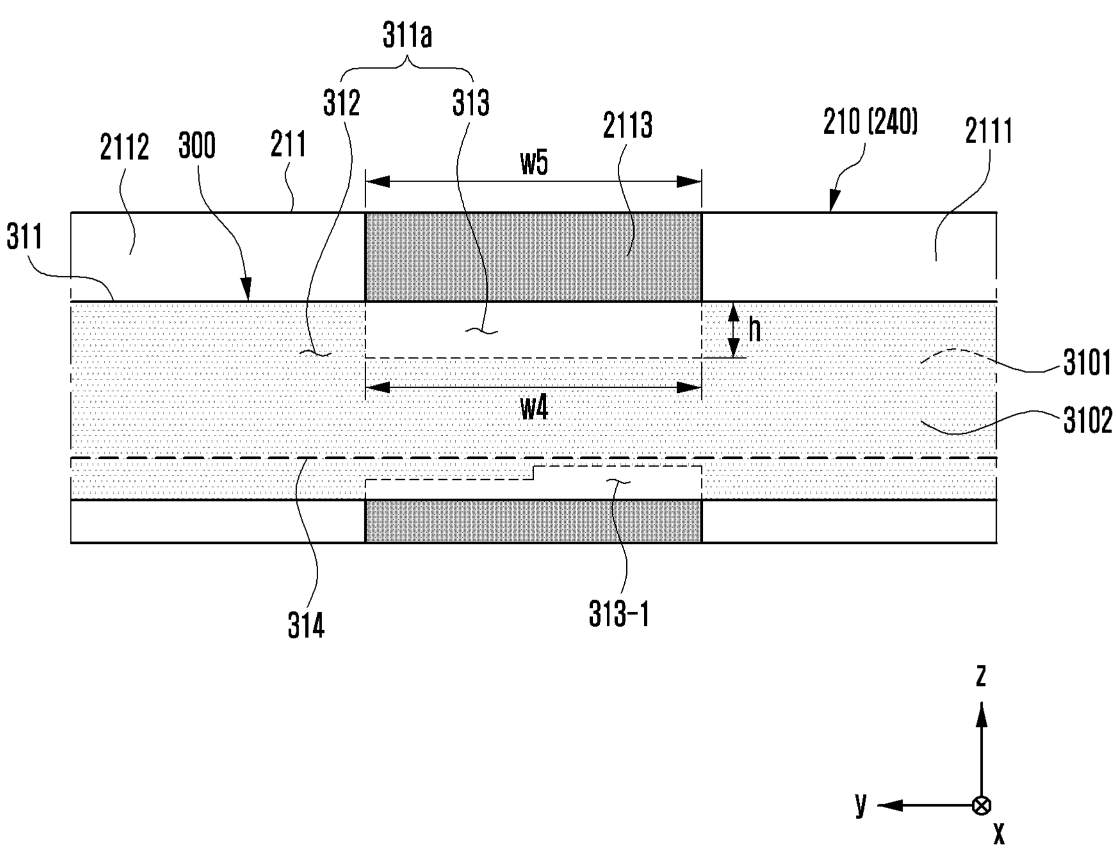
FIG. 5D is a diagram illustrating an extension of the connection circuit board viewed in the x-axis direction in the inner space of the housing according to various embodiments.

FIG. 5D is a diagram illustrating the extension of the connection circuit board viewed in the x-axis direction in the inner space of the housing according to various embodiments.

The arrangement configuration of the first conductive portion 2111 and the second conductive portion 2112 split by the first non-conductive portion 2113 of FIG. 5D may be substantially similar to that in FIG. 5C.

Referring to FIG. 5D, the connection circuit board 300 may include at least one additional non-conductive area 313-1 disposed to at least partially overlap the first non-conductive portion 2113 when viewed in the x-axis direction (e.g., when the first side surface 211 is viewed from the outside). In this case, the additional non-conductive area 313-1 may be disposed to at least partially overlap the first non-conductive portion 2113 or to overlap the first non-conductive portion 2113 with a size smaller than the first non-conductive portion 2113 when viewed in the x-axis direction. In an embodiment, the radiation performance of the antenna using the first conductive portion 2111 may be determined by adjusting a coupling amount between the first non-conductive portion 2113 and the conductive area 312 of the connection circuit board 300 by disposing the at least one additional non-conductive area 313-1 to overlap the first non-conductive portion 2113. In an embodiment, the distance between the non-conductive area 313 and the at least one additional non-conductive area 313-1 may be the same as or at least partially different from each other.

Figure 6:
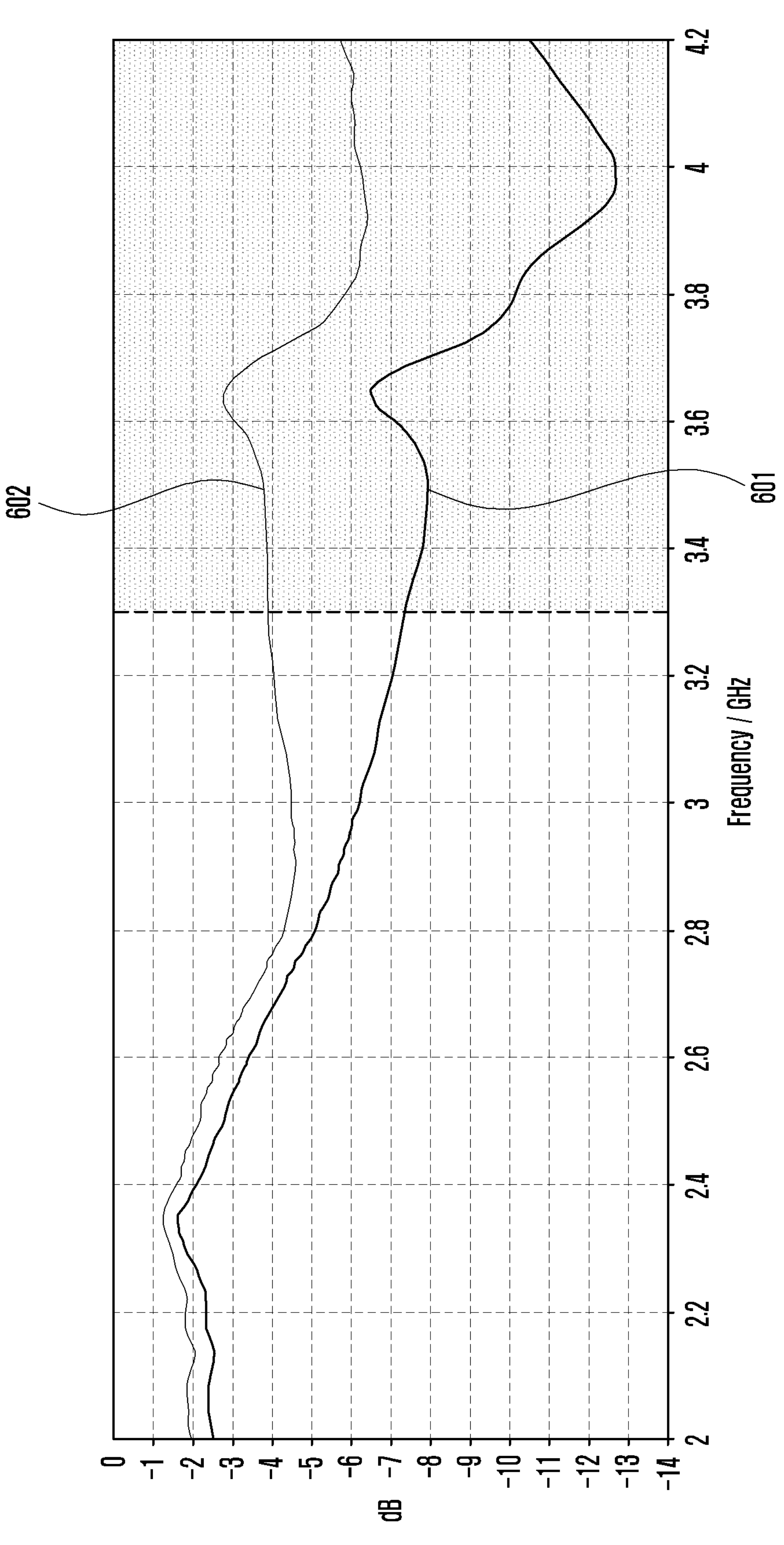
FIG. 6 includes radiation performance graphs illustrating, in comparison, radiation performance of antennas depending on whether or not there is a non-conductive area in the connection circuit board according to various embodiments.

FIG. 6 includes radiation performance graphs illustrating, in comparison, radiation performance of antennas depending on whether or not there is a non-conductive area in the connection circuit board according to various embodiments.

Referring to FIG. 6, it can be seen that, compared to a comparative example in which there is no non-conductive area 313 provided in the connection circuit board 300 to correspond to the first non-conductive portion 2113 (e.g., Graph 601), the antenna using the first conductive portion 2111 is capable of operating in a wide range, for example, the n77 band (e.g., a band ranging from about 3.3 GHz to about 4.2 GHz), when a non-conductive area 313 is provided in the connection circuit board 300 to correspond to the first non-conductive portion 2113 (e.g., Graph 602). This may refer, for example, to when the non-conductive area 313 of the connection circuit board 300 corresponds to the first non-conductive portion 2113, the radiation performance of the antenna using the first conductive portion 2111 being improved.

Figure 7:
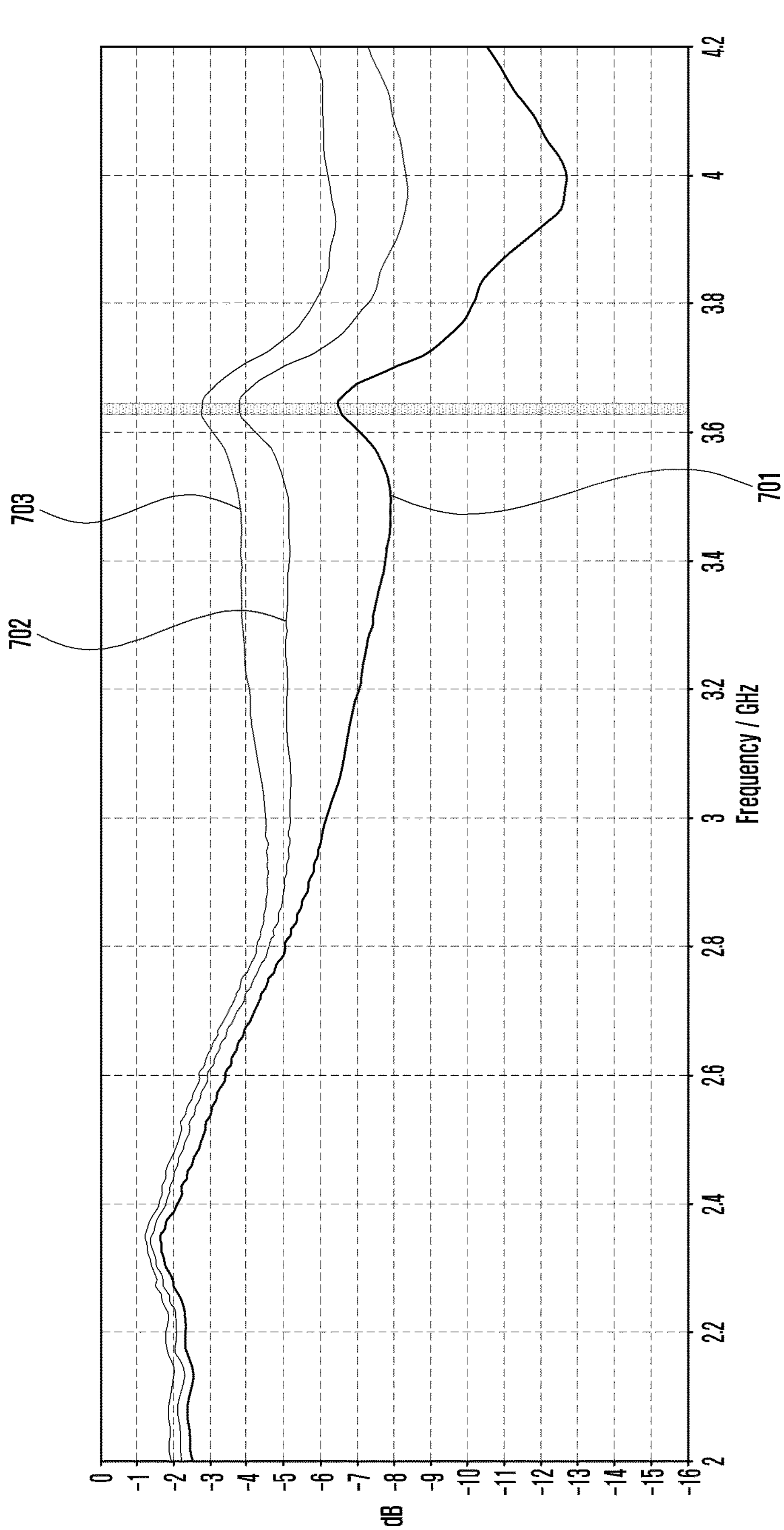
FIG. 7 includes radiation performance graphs illustrating, in comparison, radiation performance of antennas depending on a change in a width of a non-conductive area according to various embodiments.

FIG. 7 includes radiation performance greaphs illustrating, in comparison, radiation performance depending on a change in a width of a non-conductive area according to various embodiments.

Referring to FIGS. 5C and 7, it can be seen that, compared to a comparative example in which there is no non-conductive area 313 provided in the connection circuit board 300 to correspond to the first non-conductive portion (e.g., Graph 701), the antenna using the first conductive portion 2111 is improved by about 3 dB in radiation efficiency in the n77 band (e.g., a band of about 3.65 GHz) when a non-conductive area 313 having a depth h of 0.5 mm and a width w4 of 1 mm is provided in the connection circuit board 300 and disposed to overlap a first non-conductive portion 2113 having a width w5 of 1.5 mm (e.g., Graph 702). In addition, it can be seen that, when a non-conductive area 313 having a depth h of 0.5 mm and a width w4 of 1.5 mm is provided in the connection circuit board 300 and disposed to overlap a first non-conductive portion 2113 having a width w5 of 1.5 mm (e.g., Graph 703), radiation efficiency is improved by about 4 dB in the n77 band (e.g., about 3.65 GHz band). This may illustrate that, as the width w4 of the non-conductive area 313 provided in the connection circuit board 300 increases, the radiation efficiency of the antenna is improved. In various embodiments, this may illustrate that, compared to the case where the width (w4) of the non-conductive area 313 provided on the connection circuit board 300 is smaller than the width w5 of the first non-conductive portion 2113 (e.g., Graph 702), the radiation performance of the antenna is improved when the width w4 of the non-conductive area 313 is substantially the same as the width w5 of the first non-conductive portion 2113 and the non-conductive area and the first non-conductive portion overlap each other (e.g., Graph 703). In various embodiments, the radiation performance of the antenna may change depending as the non-conductive area changes in depth h.

Figure 8A:
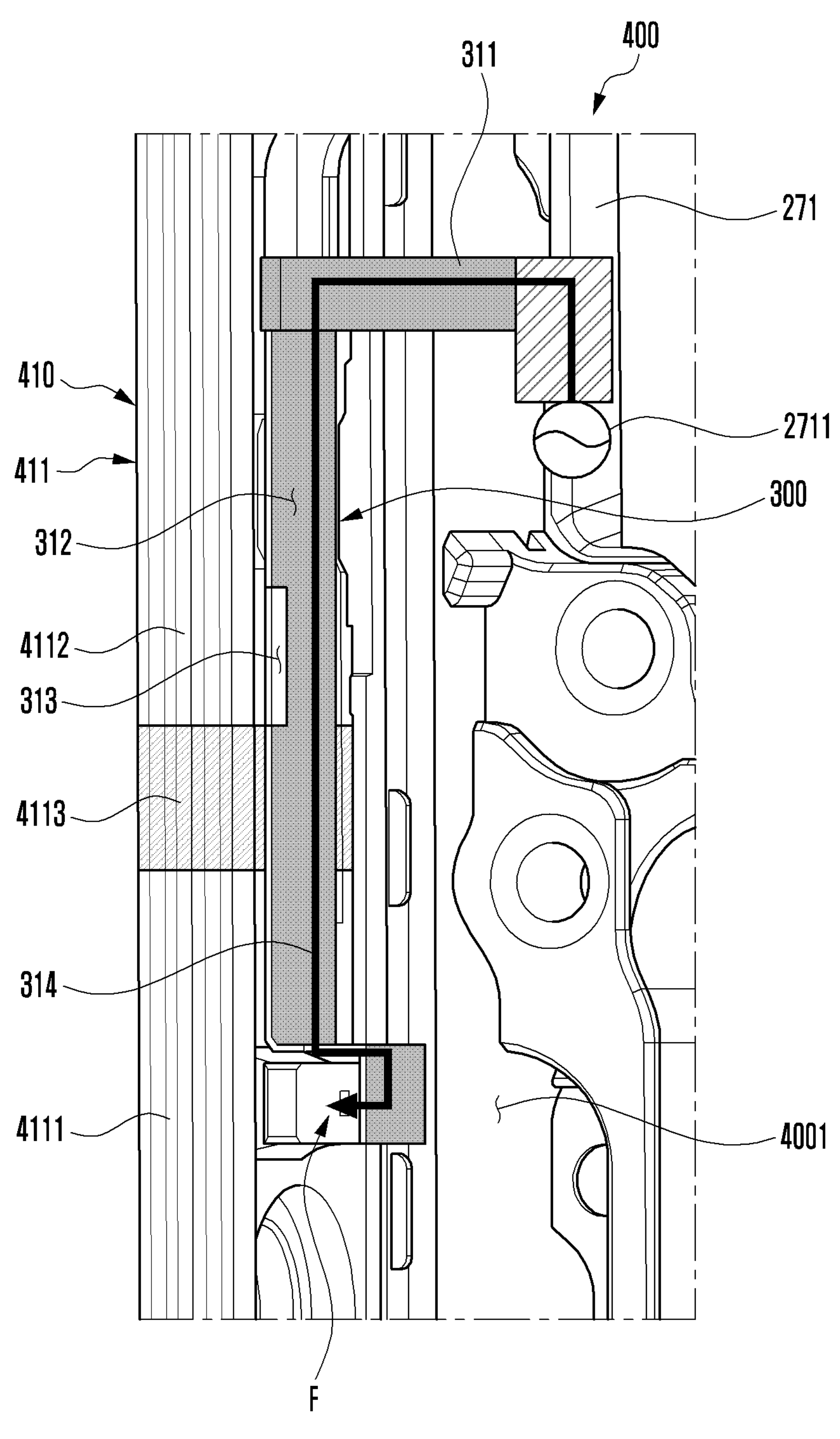
FIGS. 8A, 8B and 8C are diagrams illustrating arrangement relationships between a non-conductive area and a non-conductive portion according to various embodiments.
Figure 8B:
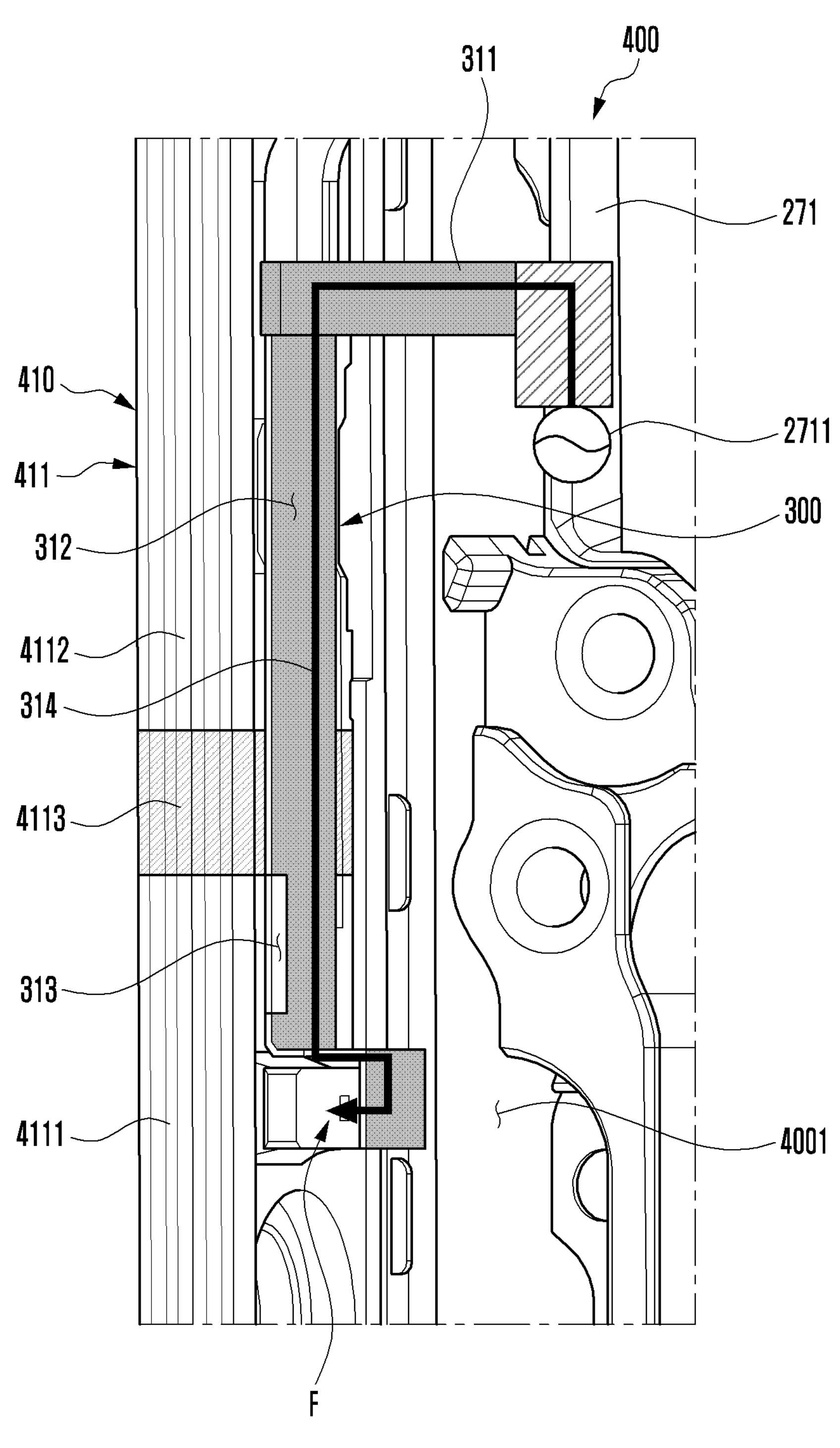
Figure 8C:
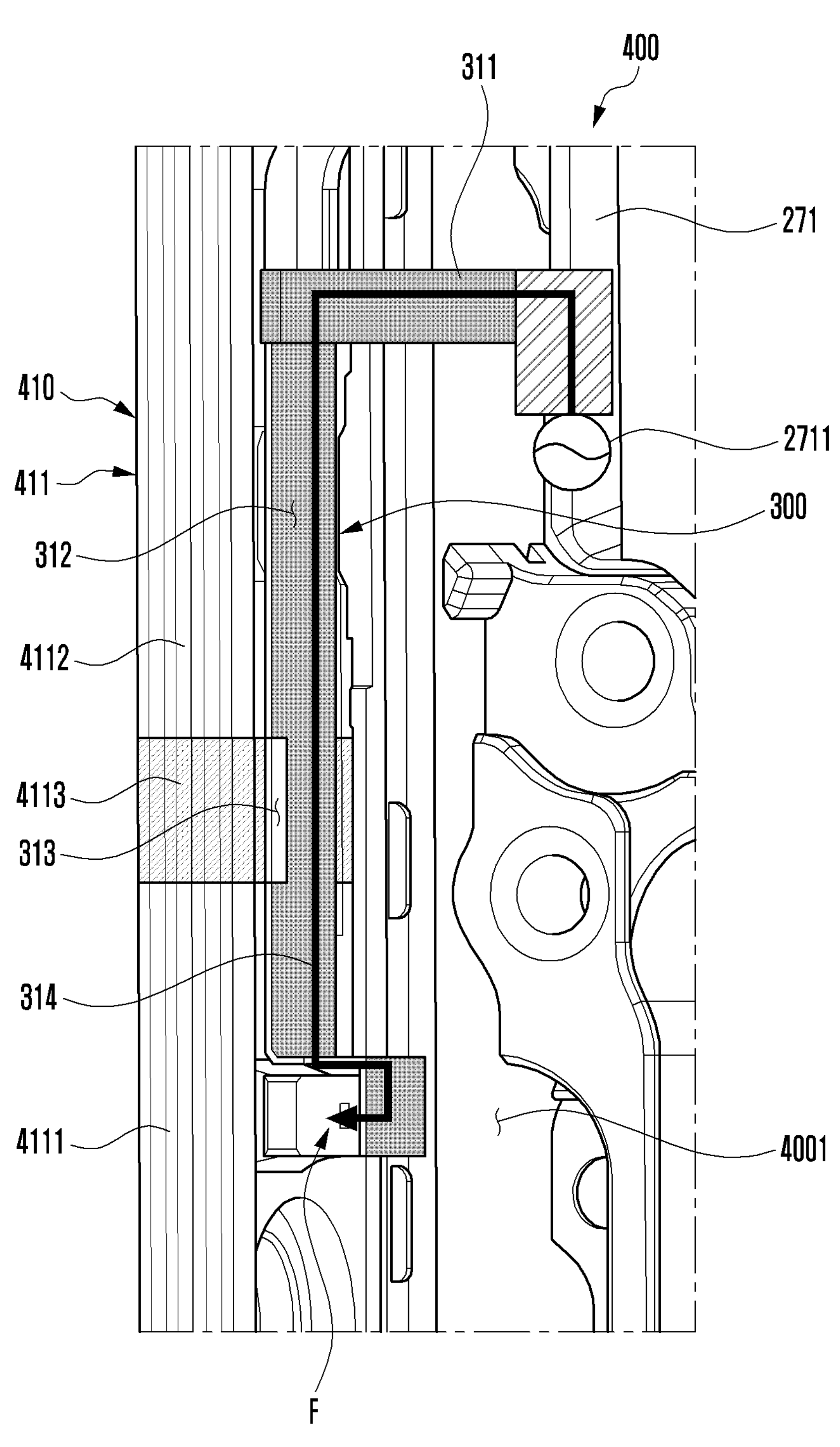

FIGS. 8A, 8B and 8C are diagrams illustrating various arrangement relationships between a non-conductive area and a non-conductive portion according to various embodiments.

The electronic device 400 of FIGS. 8A, 8B and 8C (which may be referred to hereinafter as FIGS. 8A to 8C) may be at least partially similar to the electronic device 100 of FIG. 1 or the electronic device 200 of FIG. 5A or may further include various embodiments of the electronic devices.

Referring to FIGS. 8A to 8C, the electronic device 400 (e.g., the electronic device 200 in FIG. 5A) may include a housing 410 (e.g., the housing 210 in FIG. 5A) including a side surface member 411 (e.g., the base bracket 240 in FIG. 5A) defining at least a portion of a side surface of the electronic device 400. In an embodiment, the side surface member 411 may include a first conductive portion 4111 (e.g., the first conductive portion 2111 in FIG. 5A) and a second conductive portion 4112 (e.g., the second conductive portion 2112 in FIG. 5A) split by a non-conductive portion 4113 (e.g., the first non-conductive portion 2113 in FIG. 5A). In an embodiment, the electronic device 400 may include a circuit board 271 (e.g., the first circuit board 271 in FIG. 5A) disposed in an inner space 4001 (e.g., the inner space 2103 in FIG. 5A) thereof and including a wireless communication circuit 2711 (e.g., the wireless communication module 192 in FIG. 1).

According to various embodiments, the electronic device 400 may include a connection circuit board 300 disposed to extend from the circuit board 271 to a feeding point F of the first conductive portion 4111 in the inner 4001 of the housing 410. In an embodiment, the connection circuit board 300 may electrically connect the wireless communication circuit 2711 of the circuit board 271 to the feeding point F of the first conductive portion 4111. In an embodiment, the connection circuit board 300 may include a conductive area 312 provided on a dielectric substrate 311 including a plurality of insulating layers and a non-conductive area 313. In an embodiment, the wireless communication circuit 2711 may be provided on an insulating layer different from the conductive area 312 of the connection circuit board 300, and may be configured to operate the first conductive portion 4111 as an antenna in a predetermined frequency band via a signal line 314 electrically connected to the feeding point F.

As illustrated in FIG. 8A, the connection circuit board 300 may be disposed such that the non-conductive area 313 does not overlap the non-conductive portion 4113 but is located on one side of the non-conductive portion 4113. In an embodiment, the non-conductive area 313 may be disposed at a position farther from the feeding point F than the non-conductive portion 4113.

As illustrated in FIG. 8B, the connection circuit board 300 may be disposed such that the non-conductive area 313 does not overlap the non-conductive portion 4113 but is located on another side of the non-conductive portion 4113. In an embodiment, the non-conductive area 313 may be disposed at a position closer from the feeding point F than the non-conductive portion 4113.

As illustrated in FIG. 8C, the connection circuit board 300 may be disposed such that the non-conductive area 313 overlaps the non-conductive portion 4113.

Figure 9:
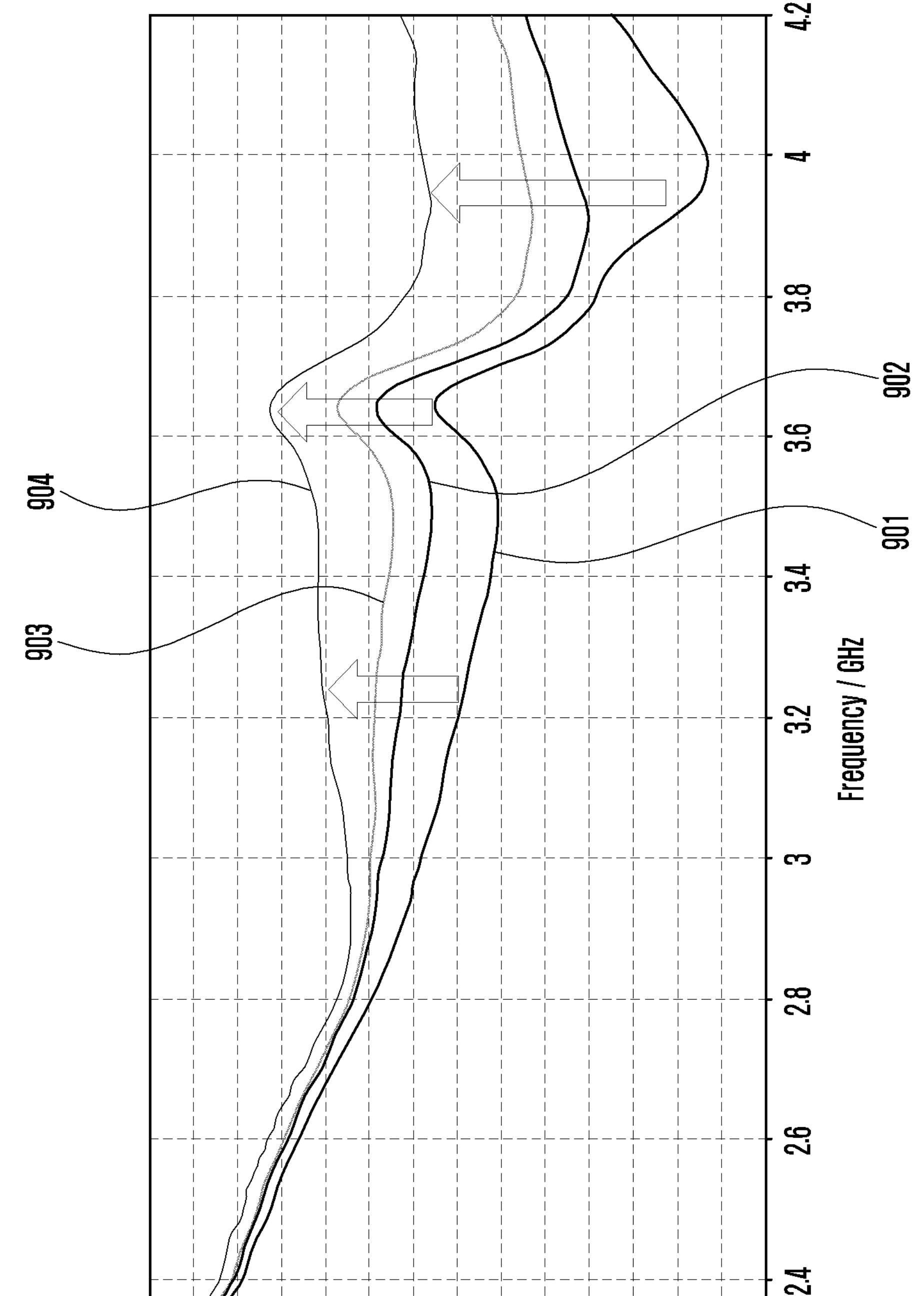
FIG. 9 includes radiation performance graphs illustrating, in comparison, antenna radiation performance corresponding to the arrangement structures of the non-conductive areas of FIGS. 8A, 8B and 8C according to various embodiments.

FIG. 9 includes radiation performance graphs illustrating, in comparison, antenna radiation performance corresponding to the arrangement structures of the non-conductive areas of FIGS. 8A, 8B and 8C according to various embodiments.

Referring to FIGS. 8A to 9, it can be seen that, compared to a comparison example in which there is no non-conductive area 313 near the non-conductive portion 4113 (e.g., Graph 901), the antenna using the first conductive portion 4111 is improved in radiation performance in the n77 band (e.g., a band ranging from about 3.3 GHz to about 4.2 GHz) when a non-conductive area 313 area is disposed at a position farther from the feeding point F than the non-conductive portion 4113 (e.g., Graph 902). In addition, it can be seen that, when the non-conductive area 313 is disposed closer to the feeding point F than the non-conductive portion 4113 as illustrated in FIG. 8B (e.g., Graph 903), the radiation performance is improved in the n77 band (e.g., a band ranging from about 3.3 GHz to about 4.2 GHz) compared to the case where the non-conductive area 313 is disposed at a position farther from the feeding point F than the non-conductive portion 4113 (e.g., Graph 902). Furthermore, it can be seen that, when the non-conductive area 313 correspondingly overlaps the non-conductive portion 4113 as illustrated in FIG. 8C (e.g., Graph 904), the radiation performance is improved in the n77 band (e.g., a band ranging from about 3.3 GHz to about 4.2 GHz) compared to the case where the non-conductive area 313 is disposed closer to the feeding point F (e.g., Graph 903). This illustrates that, when the non-conductive area 313 does not overlap with the non-conductive portion 4113 but is located around the non-conductive portion 4113, the antenna using the first conductive portion 4111 is improved in radiation performance compared to the case where the non-conductive area 313 of the connection circuit board 300 does not exist (e.g., Graph 901). In addition, this may illustrate that the antenna using the first conductive portion 4111 is improved in radiation performance when the non-conductive area 313 coincides with and overlaps the non-conductive portion 4113 (e.g., Graph 904) compared to the case where the non-conductive area 313 does not overlap the non-conductive portion 4113 but is disposed around the non-conductive area 313 (e.g., Graphs 902 and 903).

Figure 10A:
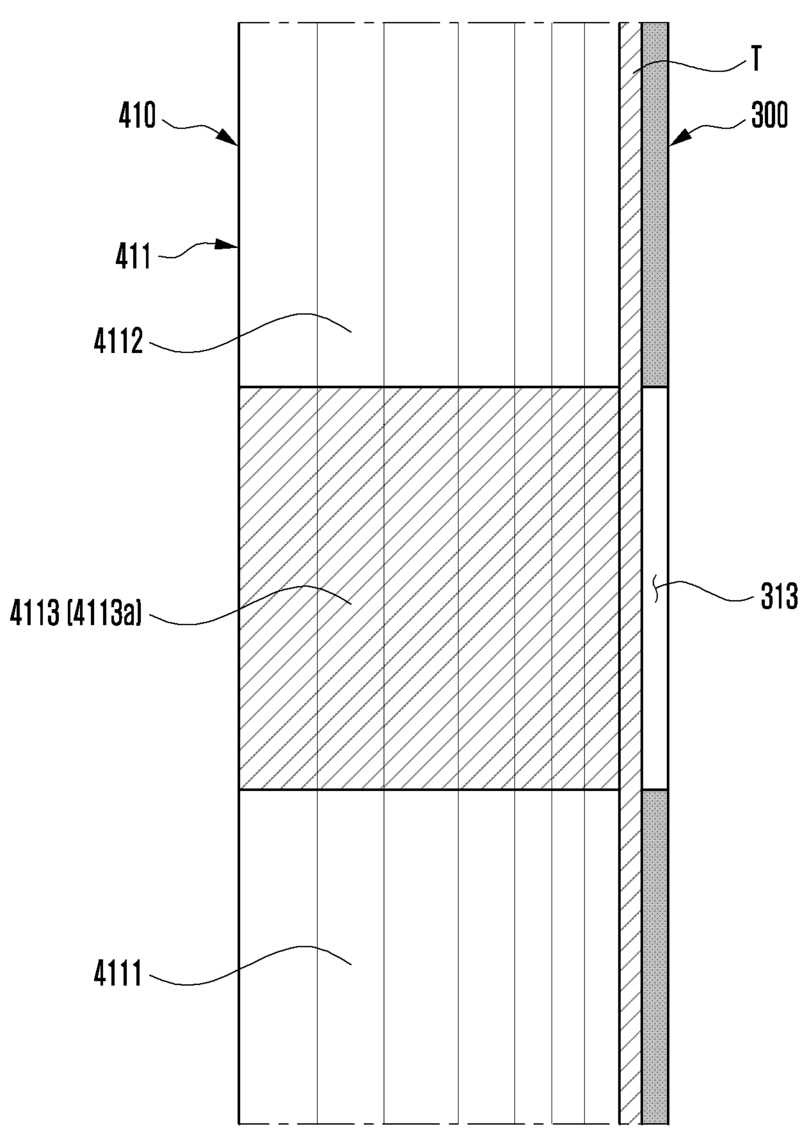
FIGS. 10A, 10B and 10C are diagrams illustrating arrangement relationships between a non-conductive portion and a non-conductive area according to various embodiments.
Figure 10B:
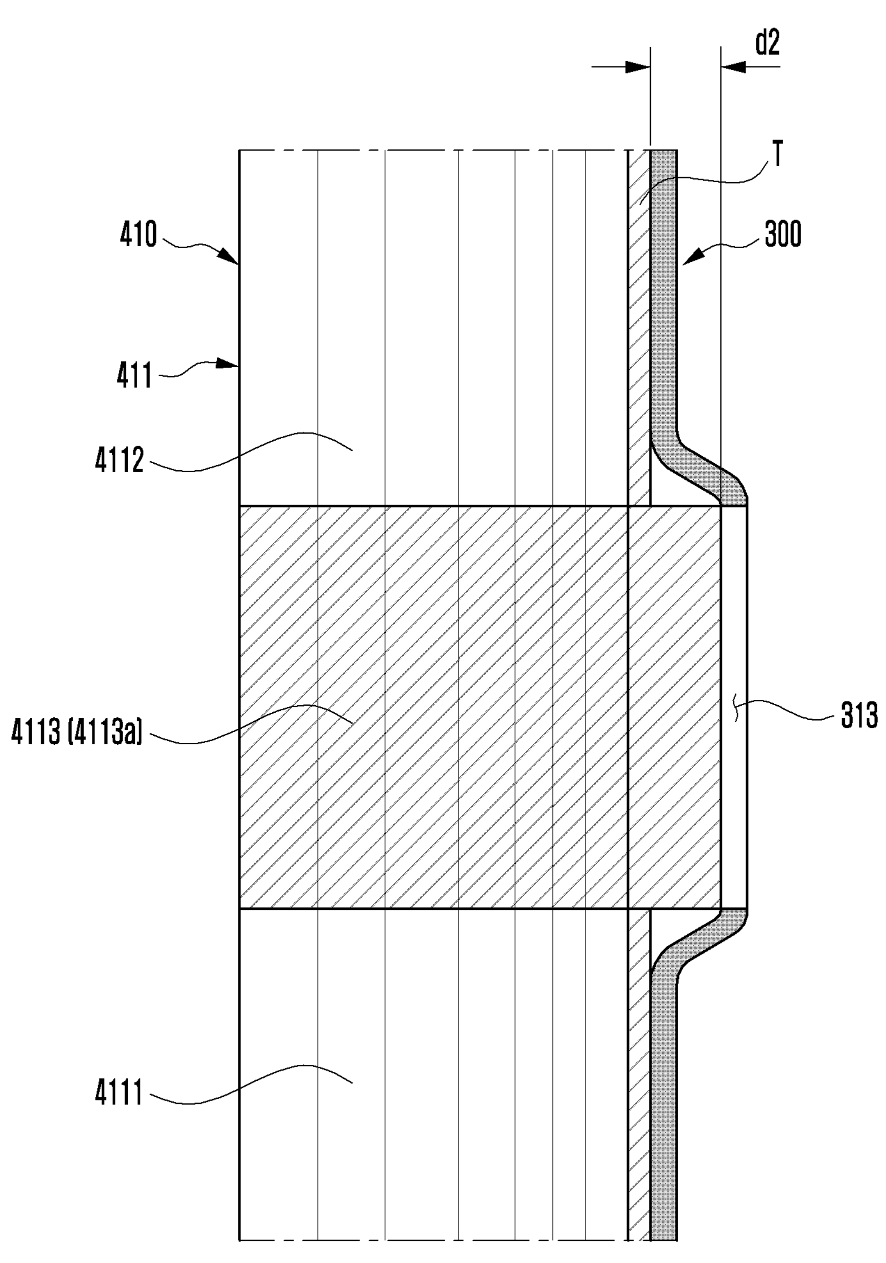
Figure 10C:
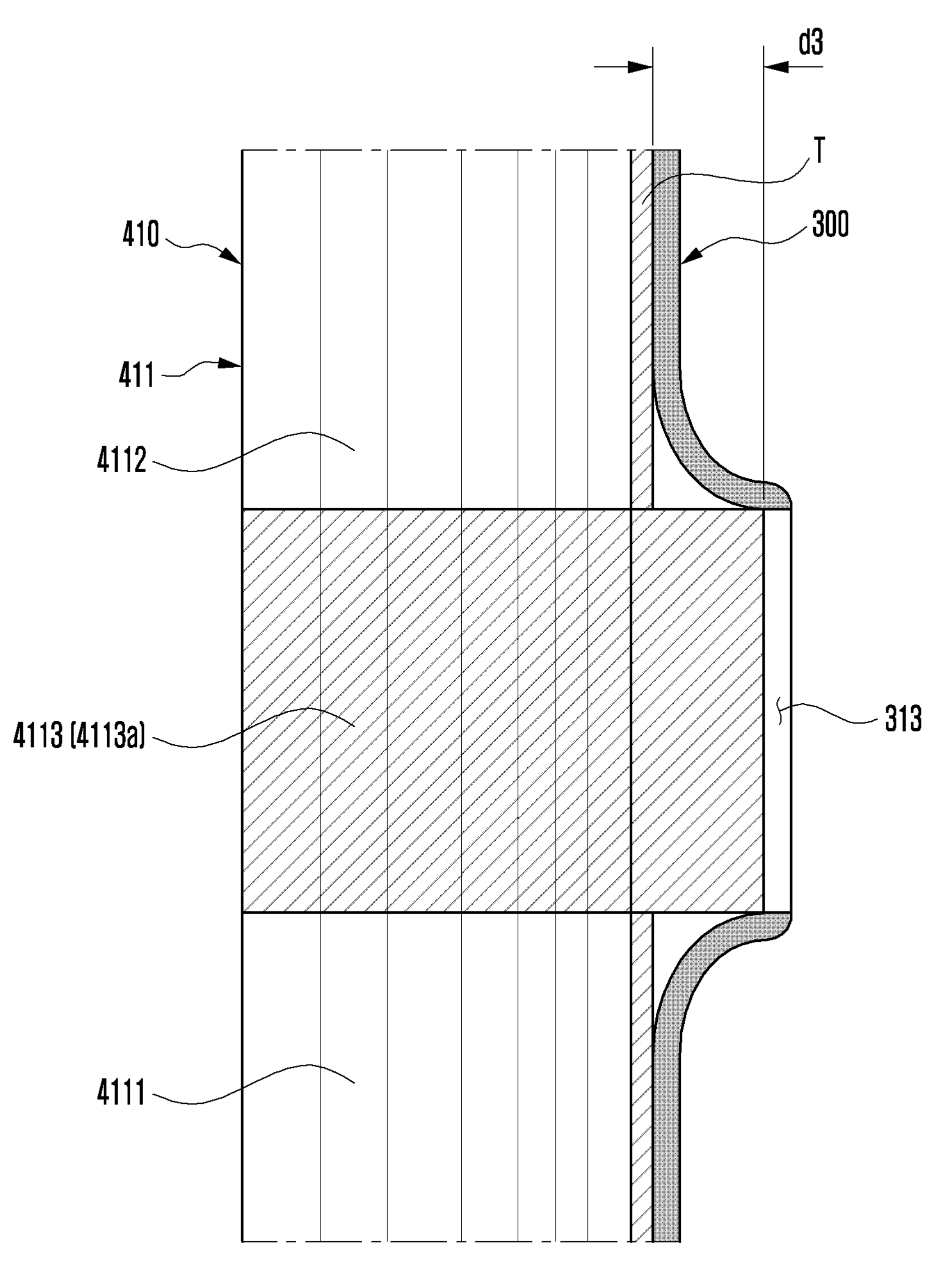

FIGS. 10A, 10B and 10C are diagrams illustrating various arrangement relationships between a non-conductive portion and a non-conductive area according to various embodiments.

Referring to FIGS. 10A, 10B and 10C (which may be referred to hereinafter as FIGS. 10A to 10C), an electronic device (e.g., the electronic device 400 in FIG. 8A) may include a housing 410 including a side surface member 411 that defines at least a portion of a side surface. In an embodiment, the side surface member 411 may include a first conductive portion 4111 and a second conductive portion 4112 split by a non-conductive portion 4113. In an embodiment, the non-conductive portion 4113 may be filled, for example, with polymer 4113*a*. For example, in the side surface member 411, the conductive portions 4111 and 4112 made of metal and the polymer 4113*a* provided as the non-conductive portion 4113 may be coupled to each other through injection molding.

According to various embodiments, an electronic device (e.g., the electronic device 400 in FIG. 8A) may include a connection circuit board 300 disposed to extend from a circuit board (e.g., the circuit board 271 in FIG. 8A) of the housing 410 to a feeding point (e.g., the feeding point F in FIG. 8A) of the first conductive portion 4111 in the inner space (e.g., the inner space 4001 in FIG. 8A) of the housing 410. In an embodiment, the connection circuit board 300 may include a non-conductive area 313 correspondingly disposed to overlap the non-conductive portion 4113.

As illustrated in FIG. 10A, the connection circuit board 300 may be fixed by being attached to the inner surface of the side surface member 411 by a tape member T having a predetermined thickness (e.g., about 0.1 mm). In this case, the non-conductive area 313 may be disposed to have a distance from the non-conductive portion 4113 equal to the thickness of the tape member (e.g., about 0.5 mm).

As illustrated in FIG. 10B, in the connection circuit board 300, the non-conductive area 313 may be disposed to have a first separation distance d2 (e.g., about 0.5 mm) from the first conductive portion 4111 via the polymer 4113*a* protruding from the non-conductive portion 4113. In various embodiments, the non-conductive area 313 may be disposed to be attached to the polymer 4113*a* via the tape member T.

As illustrated in FIG. 10C, in the connection circuit board 300, the non-conductive area 313 may be disposed to have a second separation distance d3 (e.g., about 1 mm) from the first conductive portion 4111 via the polymer 4113*a* protruding from the non-conductive portion 4113. In various embodiments, the non-conductive area 313 may be disposed to be attached to the polymer 4113*a* via the tape member T. For example, the second separation distance d3 may be greater than the first separation distance d2.

Figure 11:
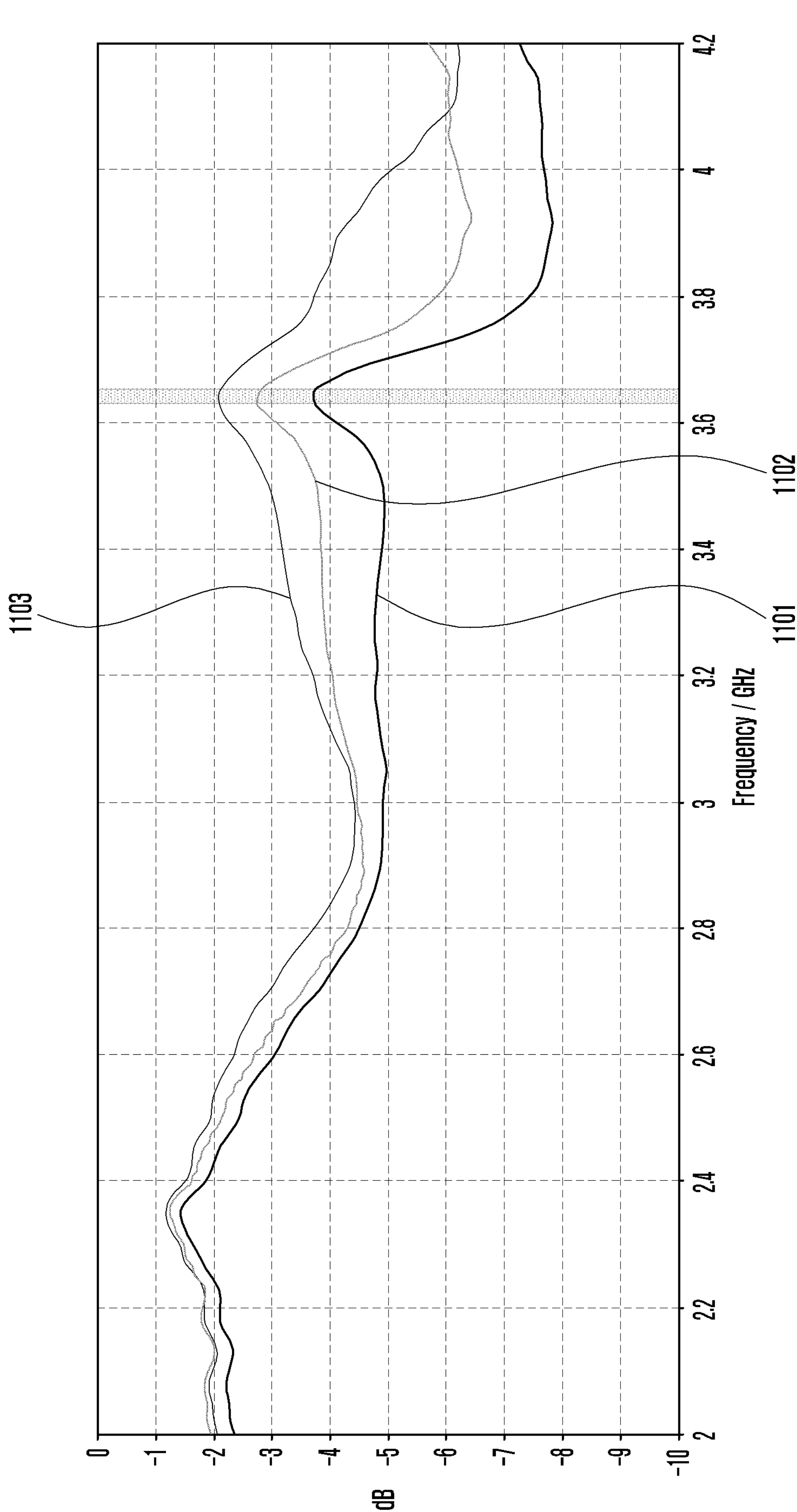
FIG. 11 includes radiation performance graphs illustrating, in comparison, radiation performance of antennas corresponding to the separation distances between the non-conductive portions and the non-conductive areas in FIGS. 10A, 10B and 10C according to various embodiments.

FIG. 11 includes radiation performance graphs illustrating, in comparison, radiation performance of antennas corresponding to the separation distances between the non-conductive portions and the non-conductive areas in FIGS. 10A, 10B and 10C according to various embodiments.

Referring to FIGS. 10A to 11, it can be seen that the antenna using the first conductive portion 4111 exhibits more excellent radiation performance in the n77 band (e.g., a band of 3.65 GHz) when the non-conductive area 313 of the connection circuit board 300 is spaced apart from the non-conductive portion 4113 by a first distance d2 (e.g., about 0.5 mm) by the polymer 4113*a* protruding from the non-conductive portion 4113 (e.g., Graph 1102) as illustrated in FIG. 10B, compared to the case where the non-conductive area 313 of the connection circuit board 300 is spaced apart from the non-conductive portion 4113 by the thickness of the tape member T (e.g., about 0.1 mm) (e.g., Graph 1101) as illustrated in FIG. 10A. In addition, it can be seen that, when the non-conductive area 313 is spaced apart from the non-conductive portion 4113 by a second distance d3 (e.g., about 1 mm) greater than the first distance d2 by the polymer 4113*a* protruding from the non-conductive portion 4113 as illustrated in FIG. 10C (e.g., Graph 1103), more excellent radiation performance is exhibited in the n77 band (e.g., a band of 3.65 GHZ). This may illustrate that, for the antenna using the first conductive portion 4111, the radiation performance is improved as the distance between the non-conductive area 313 and the non-conductive portion 4113 increases.

FIGS. 12A, 12B, 12C, 12D and 12E are diagrams illustrating various arrangement structures of connection circuit boards according to various embodiments.

Figure 12A:
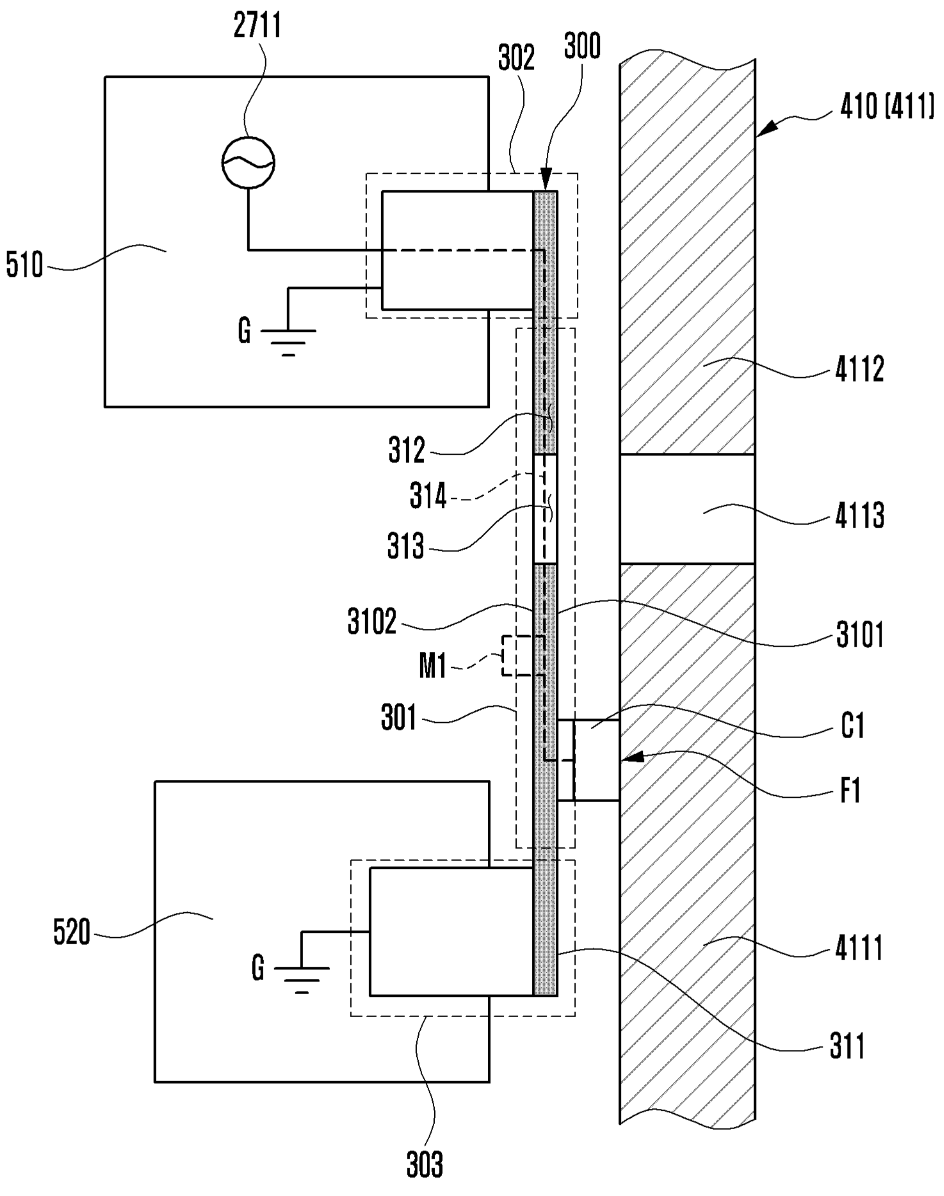
FIGS. 12A, 12B, 12C, 12D and 12E are diagrams illustrating various arrangement structures of connection circuit boards according to various embodiments.

Referring to FIG. 12A, an electronic device (e.g., the electronic device 400 in FIG. 8A) may include a housing 410 including a first side surface member 411 (e.g., the side surface member 411 in FIG. 8A) defining at least a portion of a side surface of the housing 410. In an embodiment, the first side surface member 411 may include a first conductive portion 4111 and a second conductive portion 4112 split by a non-conductive portion 4113.

According to various embodiments, the electronic device (e.g., the electronic device 400 in FIG. 8A) may include a connection circuit board 300 that electrically connects a wireless communication circuit 2711 of a circuit board 510

(e.g., the circuit board 271 in FIG. 8A) to a first feeding point F1 (e.g., the feeding point F in FIG. 8A) of the first conductive portion 4111 in the inner space of the housing 410 (e.g., the inner space 4001 in FIG. 8A). For example, the wireless communication circuit 2711 may be electrically connected to the first feeding point F1 of the first conductive portion 4111 via at least one signal line 314 (e.g., a transmission line or a feeding line) disposed between ground layers or in a portion of the conductive area 312 in the connection circuit board 300. In an embodiment, the connection circuit board 300 may include a matching circuit M1 (e.g., at least one passive element such as a capacitor and/or inductor, and/or a tuner (a tunable IC)) disposed in the at least one signal line 314. In an embodiment, the connection circuit board 300 may include an extension 301, a first connection portion 302 disposed at one end of the extension 301, and a second connection portion 303 disposed at the other end. In an embodiment, the first connection portion 302 may be electrically connected to the circuit board 510. In an embodiment, the second connection portion 303 may be electrically connected to the electrical structure 520 disposed in the inner space (e.g., the inner space 4001 in FIG. 8A) of the electronic device (e.g., the electronic device 400 in FIG. 8A). In an embodiment, the electrical structure 520 may include a sub-circuit board (e.g., the second circuit board 272 in FIG. 4) electrically connected to the circuit board 510. In this case, the second connection portion 303 may be electrically connected to a ground layer of the sub-circuit board. In various embodiments, the electrical structure 520 may include a conductive structure (e.g., a metal bracket or a shield can) disposed in the inner space (e.g., the inner space 4001 in FIG. 8A) of the electronic device (e.g., the electronic device 400 in FIG. 8A).

According to various embodiments, the connection circuit board 300 may include a first non-conductive area 313 disposed to correspondingly overlap the first non-conductive portion 4113. In an embodiment, the first non-conductive area 313 may be provided in the extension 301 of the connection circuit board 300 and disposed at a position overlapping the first non-conductive portion 4113. In an embodiment, a portion of the extension 301 of the connection circuit board 300 may be electrically connected to the first conductive portion 4111 via a first conductive contact C1 at the first feeding point F1 between the first non-conductive area 313 and the second connection portion 303. In an embodiment, the conductive area 312 of the connection circuit board 300 may be electrically connected to a ground G in the circuit board 510. In an embodiment, when the electrical structure is a sub-circuit board 520, the conductive area 312 of the connection circuit board 300 may be electrically connected to a ground G in the sub-circuit board 520. For example, the ground G in the circuit board 510 and/or the sub-circuit board 520 may be electrically connected to at least a portion of the conductive area 312 via a second surface 3102 of the connection circuit board 300.

Hereinafter, in describing FIGS. 12B, 12C, 12D and 12E, components that are substantially the same as those in FIG. 12A are given the same reference numerals, and detailed descriptions thereof may not be repeated.

Figure 12B:
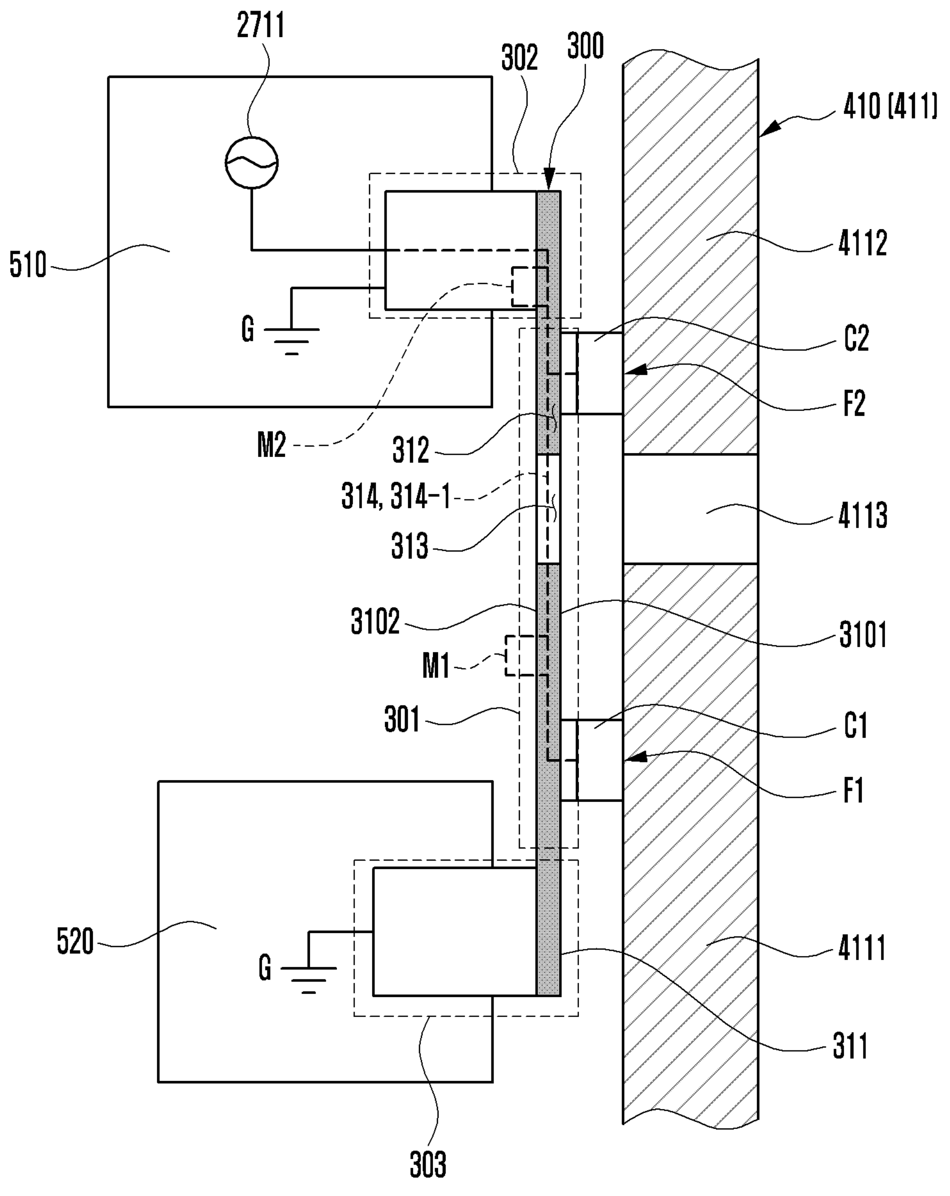

Referring to FIG. 12B, a portion of the extension 301 of the connection circuit board 300 may be electrically connected to the first conductive portion 4111 via a first conductive contact C1 at the first feeding point F1 between the first non-conductive area 313 and the second connection portion 303. In an embodiment, a portion of the extension 301 of the connection circuit board 300 may be electrically connected to the second conductive portion 4112 via a second conductive contact C2 at a second feeding point F2 between the first non-conductive area 313 and the first connection portion 302. In an embodiment, the wireless communication circuit 2711 may be electrically connected to the first feeding point F1 of the first conductive portion 4111 via a first signal line 314 disposed on the connection circuit board 300. In various embodiments, the connection circuit board 300 may include a first matching circuit M1 (e.g., at least one passive element such as a capacitor and/or inductor, and/or a tuner (a tunable IC)) disposed in the first signal line 314. In an embodiment, the wireless communication circuit 2711 may be electrically connected to the second feeding point F2 of the second conductive portion 4112 via a second signal line 314-1 disposed on the connection circuit board 300. In various embodiments, the connection circuit board 300 may include a second matching circuit M2 (e.g., at least one passive element such as a capacitor and/or inductor, and/or a tuner (a tunable IC)) disposed in the second signal line 314-1. The first signal line 314 and the second signal line 314-1 are illustrated as partially overlapping each other, but may be electrically separated from each other in the conductive area 312. Accordingly, the wireless communication circuit 2711 may be configured to operate in at least one first frequency band via the first conductive portion 4111 and may be configured to operate in at least one second frequency band via the second conductive portion 4112.

Figure 12C:
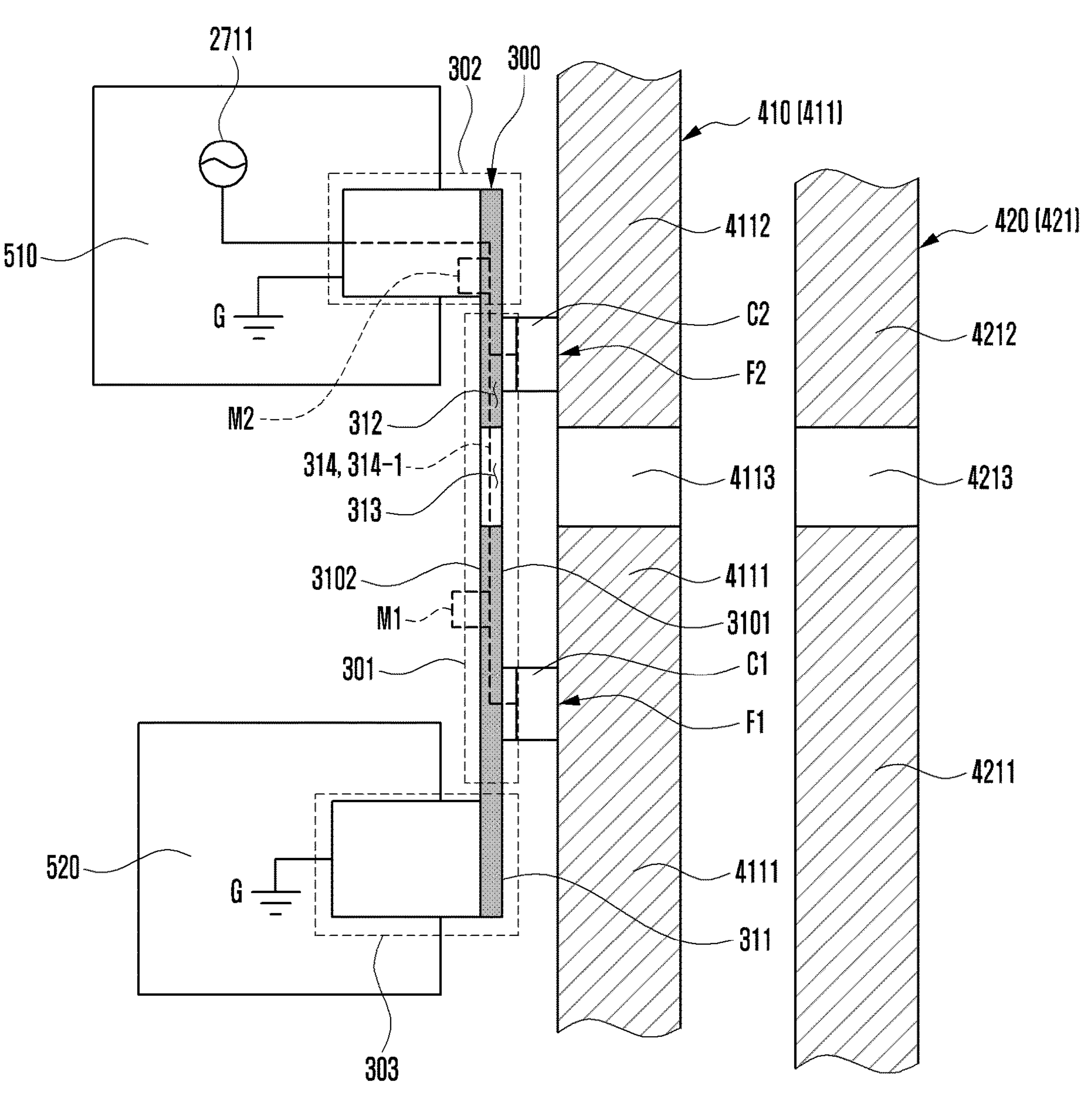

Referring to FIG. 12C, the electronic device (e.g., the electronic device 400 in FIG. 8A) may include an external housing 420 disposed outside the housing 410 of FIG. 12B. In an embodiment, the external housing 420 may include a second side surface 421 split by a second non-conductive portion 4213 (e.g., an external non-conductive portion) and including a third conductive portion 4211 disposed to correspond to the first conductive portion 4111 and a fourth conductive portion 4212 disposed to correspond to the second conductive portion 4112. In this case, the second non-conductive portion 4213 is disposed at a position overlapping the first non-conductive portion 4113 when the external housing 420 is viewed from the outside, so that, when the first conductive portion 4111 operates as an antenna, the third conductive portion 4211 is also exposed to the outside as a portion of the antenna, thereby suppressing degradation of radiation performance.

Figure 12D:
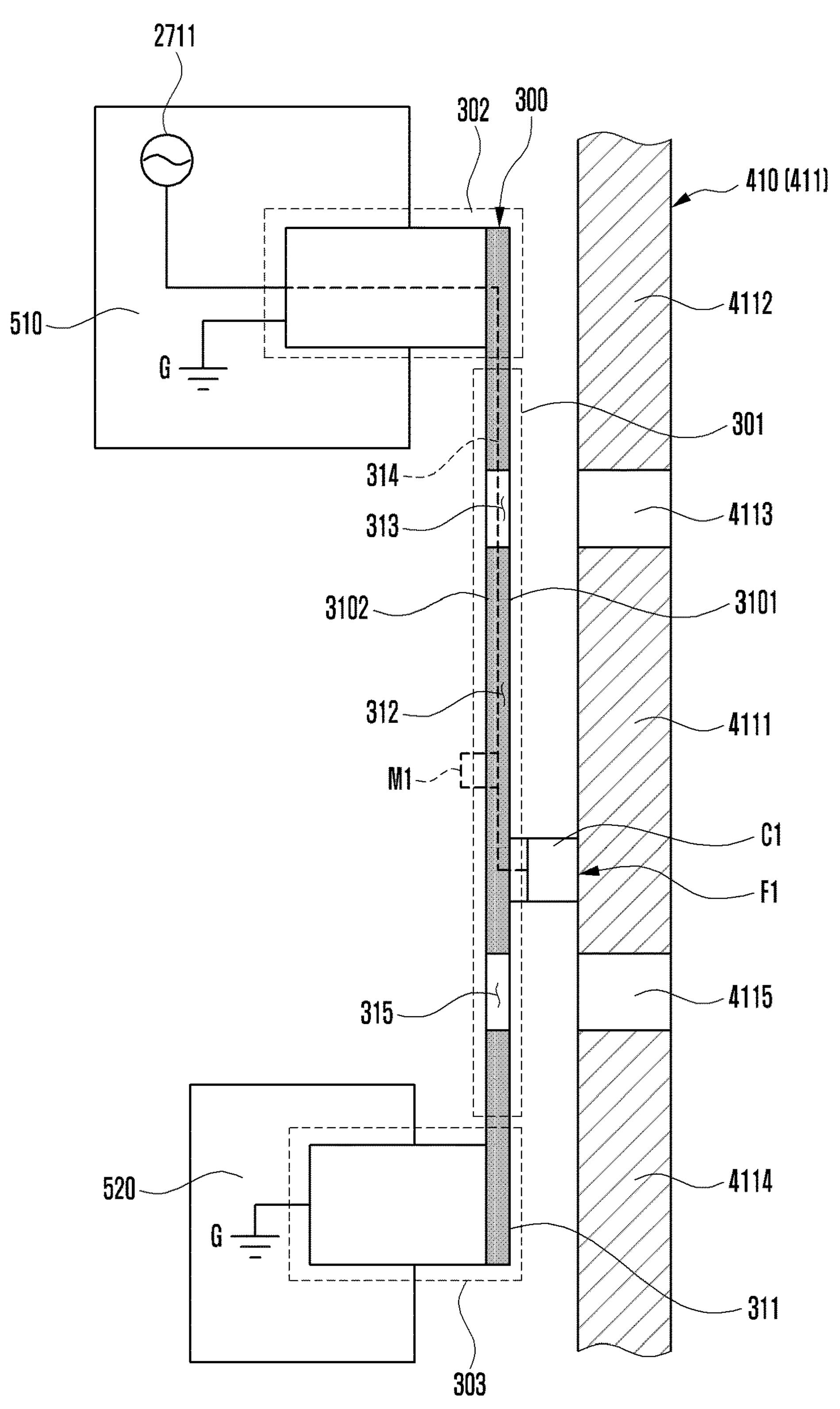

Referring to FIG. 12D, in FIG. 12A, the first side surface member 411 may include a second non-conductive portion 4115 provided between the first conductive portion 4111 and the third conductive portion 4114. In an embodiment, the connection circuit board 300 may include a first non-conductive area 313 disposed in an area corresponding to the first non-conductive portion 4113 and a second non-conductive area 315 disposed in an area corresponding to the second non-conductive portion 4115. In an embodiment, a portion of the extension 301 of the connection circuit board 300 may be electrically connected to the first conductive portion 4111 via the first conductive contact C1 at a first feeding point F1 between the first non-conductive area 313 and the second non-conductive area 315.

Figure 12E:
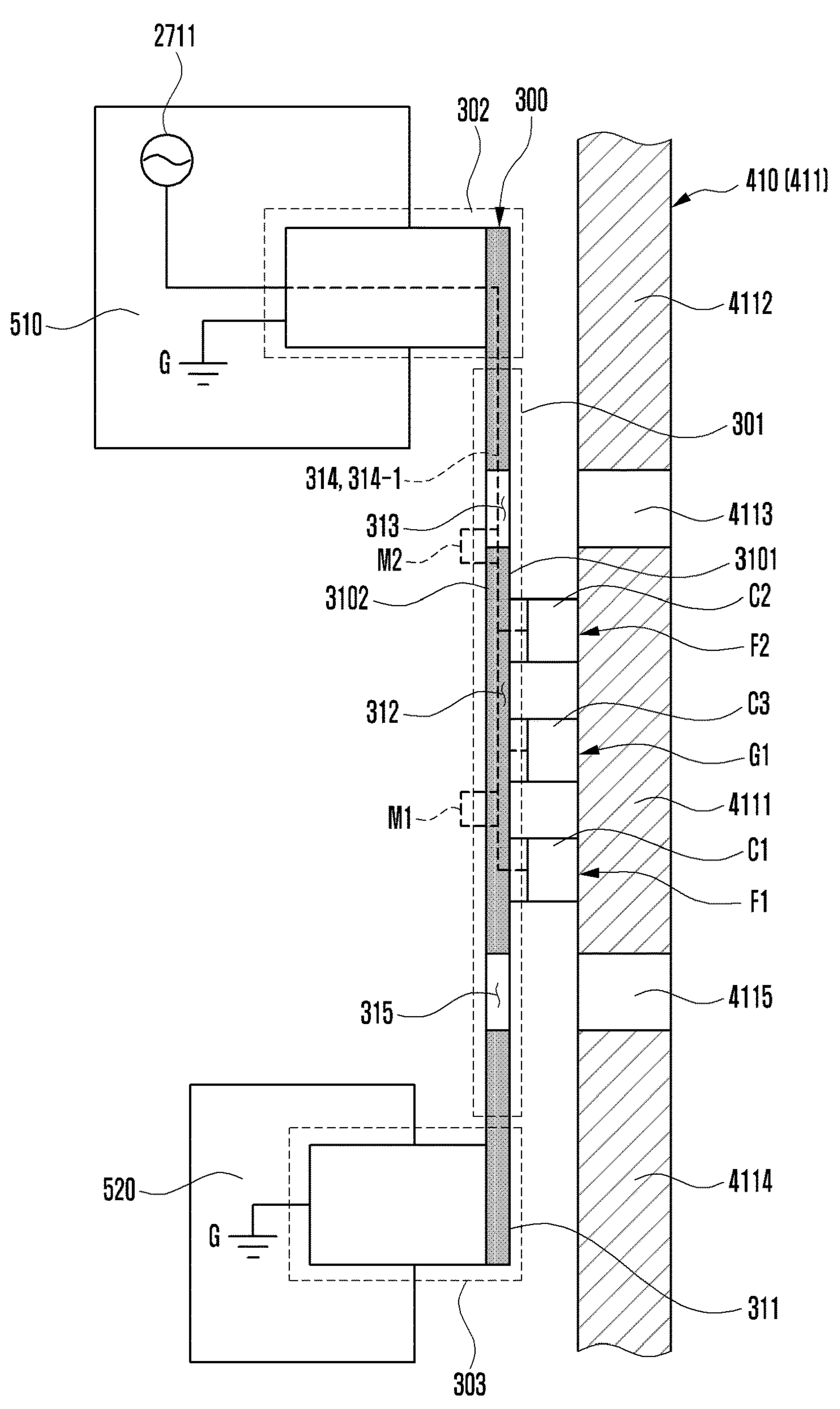

Referring to FIG. 12E, in FIG. 12D, a portion of the extension 301 of the connection circuit board 300 may be electrically connected to the first conductive portion 4111 via the first conductive contact C1 at the first feeding point F1 between the first non-conductive area 313 and the second non-conductive area 315. In an embodiment, a portion of the extension 301 of the connection circuit board 300 may be electrically connected to the first conductive portion 4111 via a second conductive contact C2 at a second feeding point F2 between the first feeding point F1 and the first non-conductive area 313. In an embodiment, a portion of the extension 301 of the connection circuit board 300 may be electrically connected to the first conductive portion 4111 via a third conductive contact C3 at a third point G1 between the first feeding point F1 and the second feeding point F2. In an embodiment, the first feeding point F1 and the second feeding point F2 may be electrically connected to the wireless communication circuit 2711 of the circuit board 510 via the connection circuit board 300. In an embodiment, the third point G1 may be electrically connected to the conductive area 312 of the connection circuit board 300 and the ground G of the circuit board 510 via the connection circuit board 300. In an embodiment, the wireless communication circuit 2711 may be electrically connected to the first feeding point F1 of the first conductive portion 4111 via a first signal line 314 disposed on the connection circuit board 300. In various embodiments, the connection circuit board 300 may include a first matching circuit M1 (e.g., at least one passive element such as a capacitor and/or inductor, and/or a tuner (a tunable IC)) disposed in the first signal line 314. In an embodiment, the wireless communication circuit 2711 may be electrically connected to the second feeding point F2 of the second conductive portion 4111 via the second signal line 314-1 disposed on the connection circuit board 300. In various embodiments, the connection circuit board 300 may include a second matching circuit M2 (e.g., at least one passive element such as a capacitor and/or inductor, and/or a tuner (a tunable IC)) disposed in the second signal line 314-1. The first signal line 314 and the second signal line 314-1 are illustrated as partially overlapping each other, but may be electrically separated from each other in the conductive area 312.

Figure 13:
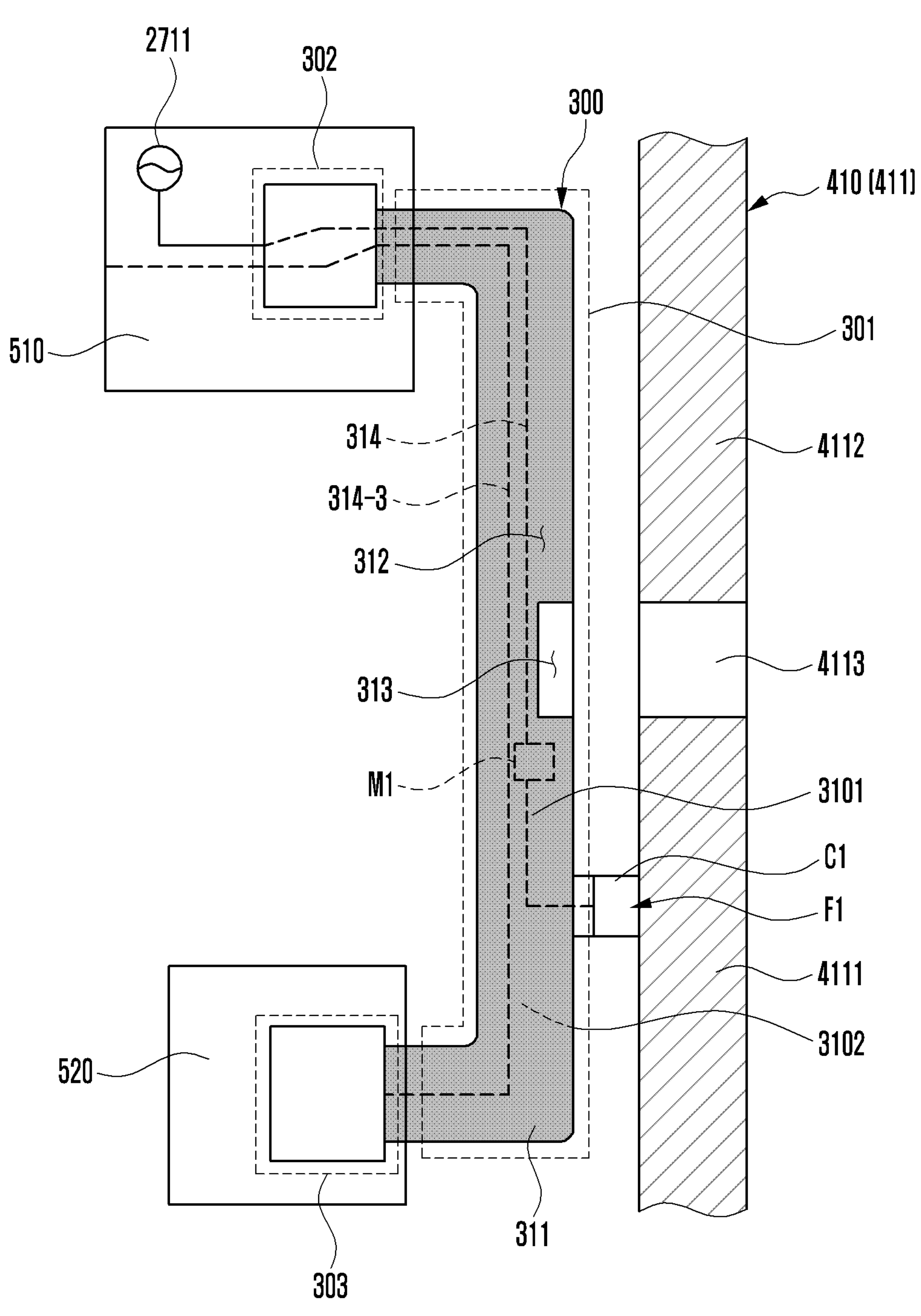
FIG. 13 is a diagram illustrating an arrangement relationship between a connection circuit board and a housing according to various embodiments.

FIG. 13 is a diagram illustrating an arrangement relationship between a connection circuit board and a housing according to various embodiments.

In describing FIG. 13, components that are substantially the same as those in FIG. 12A are given the same reference numerals, and detailed descriptions thereof may not be repeated.

Referring to FIG. 13, an electronic device (e.g., the electronic device 400 in FIG. 8A) may include a housing 410 including a first side surface member 411 (e.g., the side surface member 411 in FIG. 8A) defining at least a portion of a side surface. In an embodiment, the first side surface member 411 may include a first conductive portion 4111 and a second conductive portion 4112 split by a first non-conductive portion 4113.

According to various embodiments, the electronic device (e.g., the electronic device 400 in FIG. 8A) may include a connection circuit board 300 that electrically connects a wireless communication circuit 2711 disposed on a circuit board 510 (e.g., the circuit board 271 in FIG. 8A) to a first feeding point F1 (e.g., the feeding point F in FIG. 8A) of the first conductive portion 4111 in the inner space of the housing 410 (e.g., the inner space 4001 in FIG. 8A). For example, the wireless communication circuit 2711 may be electrically connected to the first feeding point F1 of the first conductive portion 4111 via at least one signal line 314 (e.g., a transmission line or a feeding line) disposed between or in a portion of the conductive area 312 in the connection circuit board 300. In an embodiment, the connection circuit board 300 may include a matching circuit M1 (e.g., at least one passive element such as a capacitor and/or inductor, and/or a tuner (a tunable IC)) disposed in the at least one signal line 314. In an embodiment, the connection circuit board 300 may include an extension 301, a first connection portion 302 disposed at one end of the extension 301, and a second connection portion 303 disposed at the other end. In an embodiment, the first connection portion 302 may be electrically connected to the circuit board 510. In an embodiment, the second connection portion 303 may be electrically connected to the electrical structure 520 disposed in the inner space (e.g., the inner space 4001 in FIG. 8A) of the electronic device (e.g., the electronic device 400 in FIG. 8A). In an embodiment, the electrical structure 520 may include a sub-circuit board and/or a key button module disposed to receive a control signal from the circuit board 510 by being electrically connected to the circuit board 510 via a control signal line 314-3 disposed on the connection circuit board 300.

According to various embodiments, the connection circuit board 300 may include a first surface 3101 and a second surface 3102 facing away from the first surface with reference to a relatively wide surface. In an embodiment, the connection circuit board 300 may be disposed so that the first surface 3101 faces a direction perpendicular to the side surface member 411. In an embodiment, the connection circuit board 300 may include, in the extension 301, a non-conductive area 313 in which a portion of the conductive area 312 is omitted. In an embodiment, the non-conductive area 313 may be disposed in an area corresponding to the non-conductive portion 4113, thereby helping induce an enhanced current distribution near the non-conductive portion 4113 when the first conductive portion 4111 is used as an antenna.

Figure 14A:
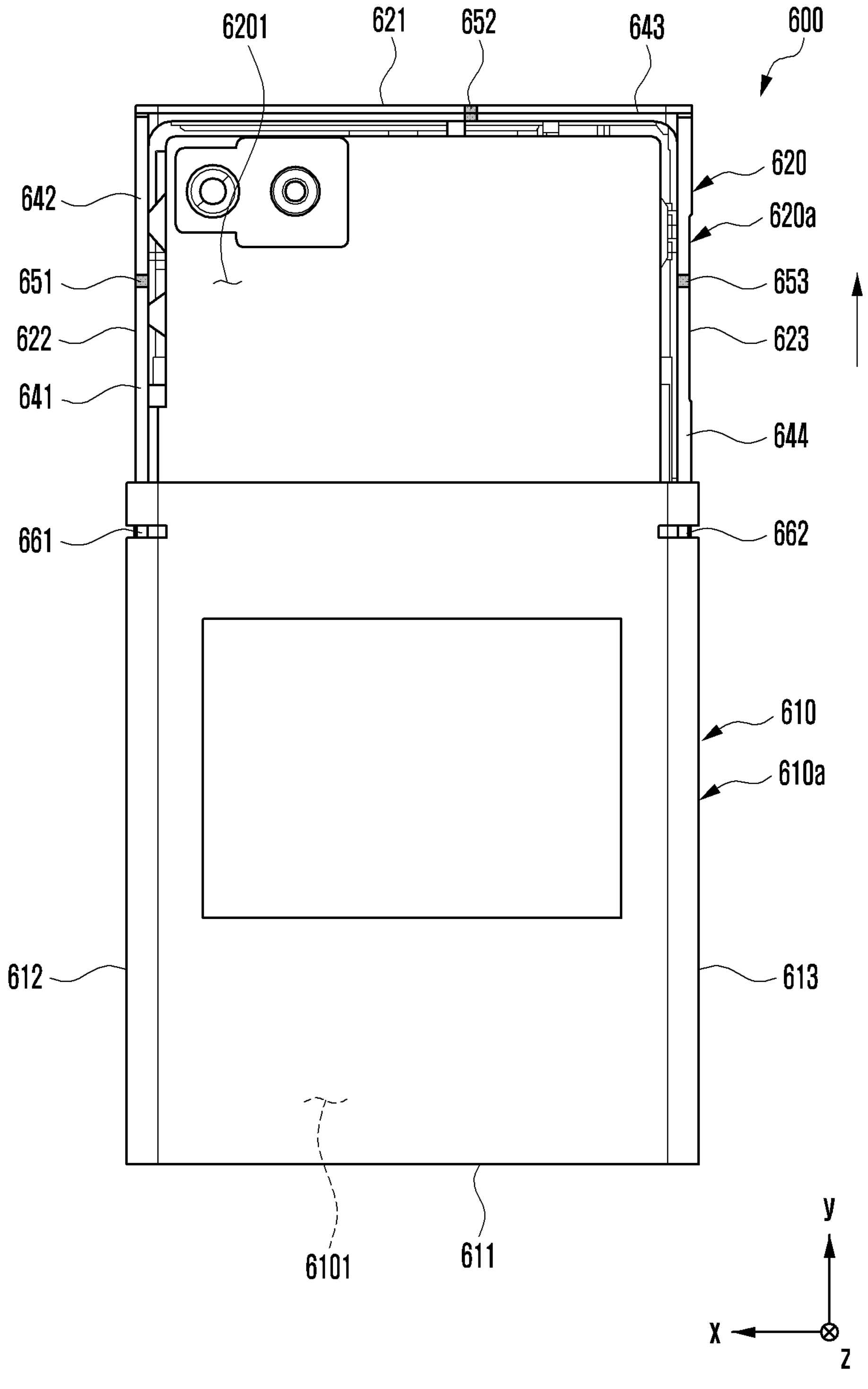
FIG. 14A is a diagram illustrating an electronic device in a slide-out state according to various embodiments.
Figure 14B:
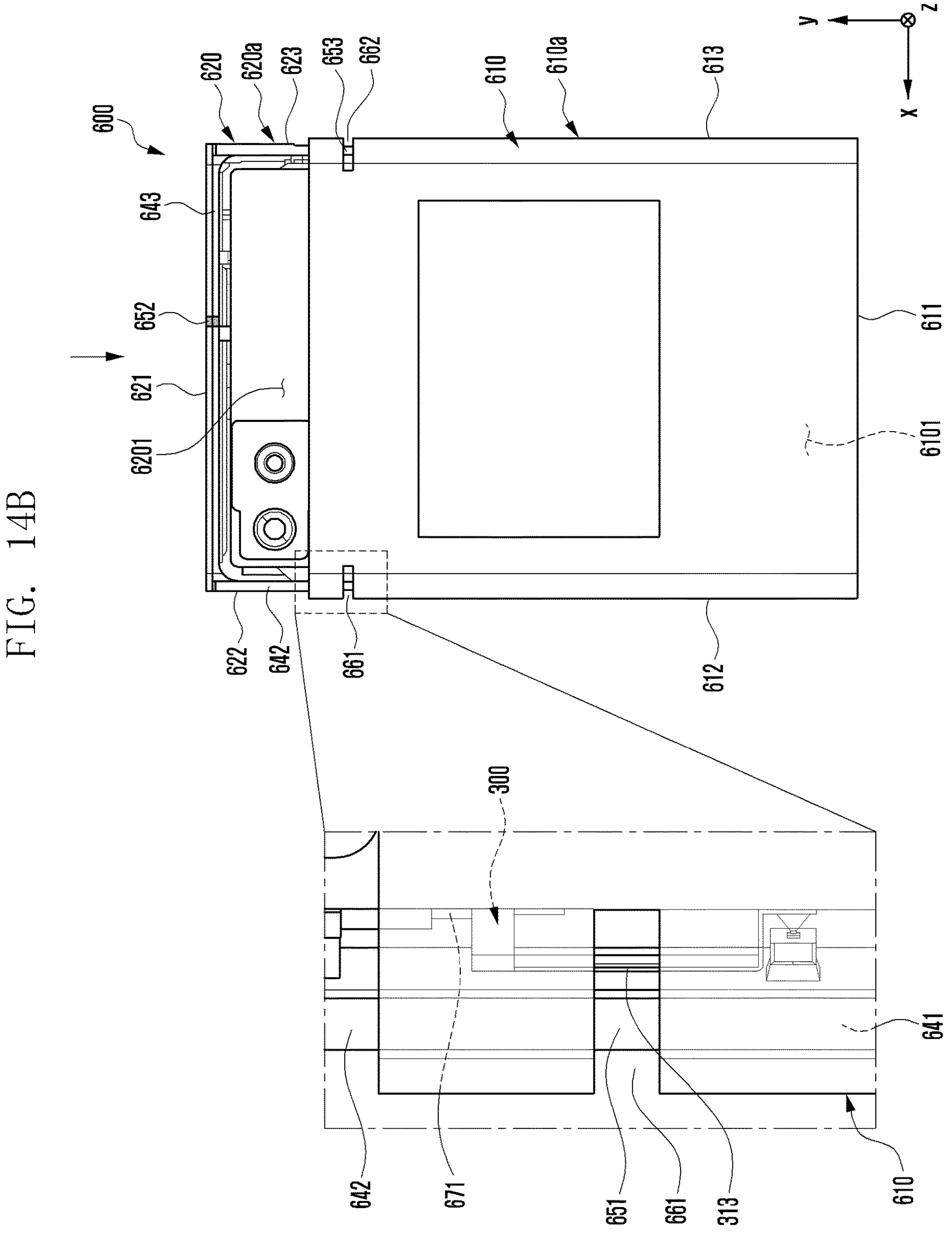
FIG. 14B is a diagram illustrating an electronic device in a slide-in state according to various embodiments.

FIG. 14A is a diagram illustrating an example electronic device in the slide-out state according to various embodiments. FIG. 14B is a diagram illustrating the electronic device in the slide-in state according to various embodiments.

The electronic device 600 in FIGS. 14A and 14B may be at least partially similar to the electronic device 100 of FIG. 1 or may further include various embodiments of the electronic device.

Referring to FIGS. 14A and 14B, an electronic device 600 may include a first housing 610 (e.g., a book cover) including a first space 6101, and a second housing (e.g., a slide body) coupled to the first housing 610 to be slidable upward (e.g., in the y-axis direction) from the first housing 610, at least partially accommodated in the first space 6101, and including a second space 6201. In an embodiment, the electronic device 600 may include a flexible display (not illustrated) disposed to be at least partially supported by the second housing 620, wherein, in the slide-out state, the flexible display is disposed to be at least partially visible from the outside by being extracted from the first space 6101 of the first housing 610, and in the slide-in state, the flexible display is disposed to be at least partially invisible from the outside by being accommodated into the first space 6101 of the first housing 610.

According to various embodiments, the first housing 610 may include a first side surface member 610*a* including a first side surface 611, a second side surface 612 extending from one end of the first side surface 611 in a direction perpendicular thereto (e.g., the y-axis direction), and a third side surface 613 extending from the other end of the first side surface 611 in a direction perpendicular thereto (e.g., the y-axis direction). In an embodiment, the first side surface member 610*a* may be at least partially made of a conductive material (e.g., a metal material).

According to various embodiments, the second housing 620 may include a second side surface member 620*a* including a fourth side surface 621, a fifth side surface 622 extending from one end of the fourth side surface 621 in a direction perpendicular thereto (e.g., the −y axis direction) and disposed to at least partially overlap the second side surface 612 in the slide-in state, and a sixth side surface 623 extending from the other end of the fourth side surface 622 in a direction perpendicular thereto (e.g., the −y-axis direction) and disposed to at least partially overlap the third side surface 613 in the slide-in state. According to an embodiment, the second side surface member 620*a* may be at least partially made of a conductive material (e.g., a metal material).

According to various embodiments, the second housing 620 may include a first conductive portion 641 disposed on a portion of the fifth side surface 621, a second conductive portion 642 disposed via a portion of the fifth side surface 622 and a portion of the fourth side surface 621, a third conductive portion 643 disposed via a portion of the fourth side surface 621 and a portion of the sixth side surface 643, and/or a fourth conductive portion 644 disposed on a portion of the sixth side surface 623. In an embodiment, the second housing 620 may include a first non-conductive portion 651 located between the first conductive portion 641 and the second conductive portion 642, a second non-conductive portion 652 located between the second conductive portion 642 and the third conductive portion, and/or a third non-conductive portion 653 located between the third conductive portion 643 and the fourth conductive portion 644.

According to various embodiments, the electronic device 600 may include a connection circuit board 300 connecting a wireless communication circuit (e.g., the wireless communication module 192 in FIG. 1) of a circuit board 671 disposed in the second space 6201 of the second housing 620 to the first conductive portion 641. In an embodiment, the connection circuit board 300 may have substantially the same arrangement structure as the connection circuit board 300 in FIGS. 5A, 5B and 5C. In an embodiment, the wireless communication circuit (e.g., the wireless communication module 192 in FIG. 1) may be configured to transmit or receive an RF signal in a predetermined frequency band via the first conductive portion 641. In this case, the connection circuit board 300 may include a non-conductive area 313. In an embodiment, the connection circuit board 300 may have a non-conductive area 313 disposed to correspond to the first non-conductive portion 651. In various embodiments, the wireless communication circuit (e.g., the wireless communication module 192 in FIG. 1) may be configured to transmit or receive an RF signal via at least one of the second conductive portion 642, the third conductive portion 643, or the fourth conductive portion 644.

According to various embodiments, the first housing 610 may include a fourth non-conductive portion 661 provided in the second side surface 612 of the first side surface member 610*a* and a fifth non-conductive portion 662 provided in the third side surface 613. In an embodiment, the fourth non-conductive portion 661 may be disposed at a position overlapping the first non-conductive portion 651 when the electronic device 600 is in the slide-in state. In an embodiment, the fifth non-conductive portion 662 may be disposed at a position overlapping the third non-conductive portion 653 when the electronic device 600 is in the slide-in state. In an embodiment, the overlapping structure of the first non-conductive portion 651 and the fourth non-conductive portion 661 may help suppress degradation of radiation performance due to interference of the first housing 610 when the first conductive portion 641 is operated as an antenna.

Figure 15:
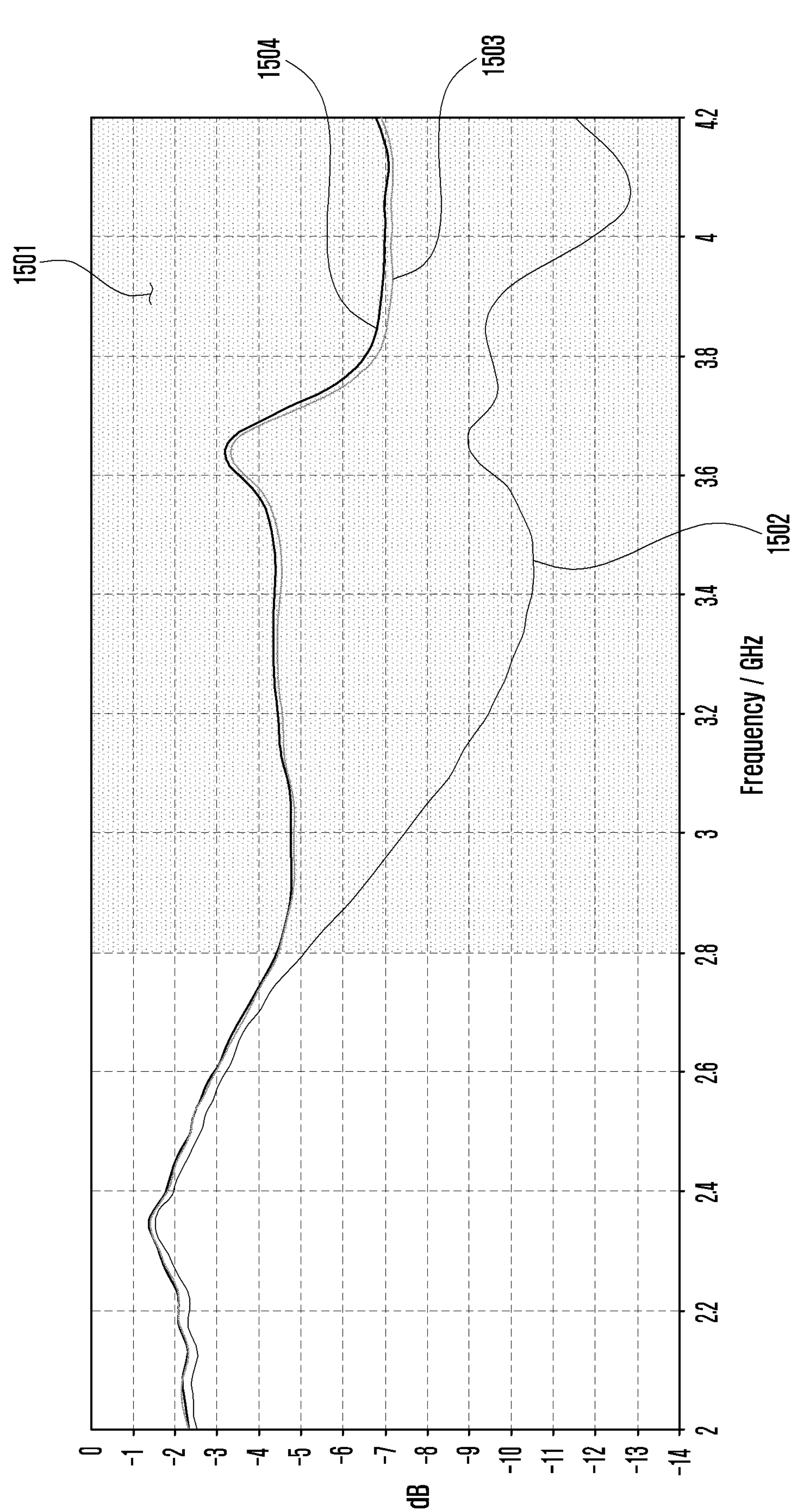
FIG. 15 includes radiation performance graphs illustrating, in comparison, radiation performance of antennas depending on whether or not there is a non-conductive portion disposed in a first housing in the slide-in state according to various embodiments.

FIG. 15 includes radiation performance graphs illustrating, in comparison, radiation performance of antennas depending on whether or not there is a non-conductive portion disposed in a first housing in the slide-in state according to various embodiments.

Referring to FIGS. 14A, 14B and 15, it can be seen that, when the fourth non-conductive portion 661 is not provided in the first housing 610, the antenna using the first conductive portion 641 is more significantly degraded in radiation performance in a predetermined frequency band (e.g., area 1501) (e.g., a band ranging from about 2.8 GHz to about 4.2 GHz) in the slide-in state (e.g., Graph 1502) than in the slide out state (e.g., Graph 1504). On the other hand, it can be seen that, when the fourth non-conductive portion 661 matching the first non-conductive portion 651 is provided in the first housing in the slide-in state, the antenna using the first conductive portion 641 exhibits substantially the same radiation performance in the slide-in state (e.g., Graph 1503) as in the slide-out state (e.g., Graph 1504), thereby helping improve the operational reliability of the electronic device 600.

Figure 16:
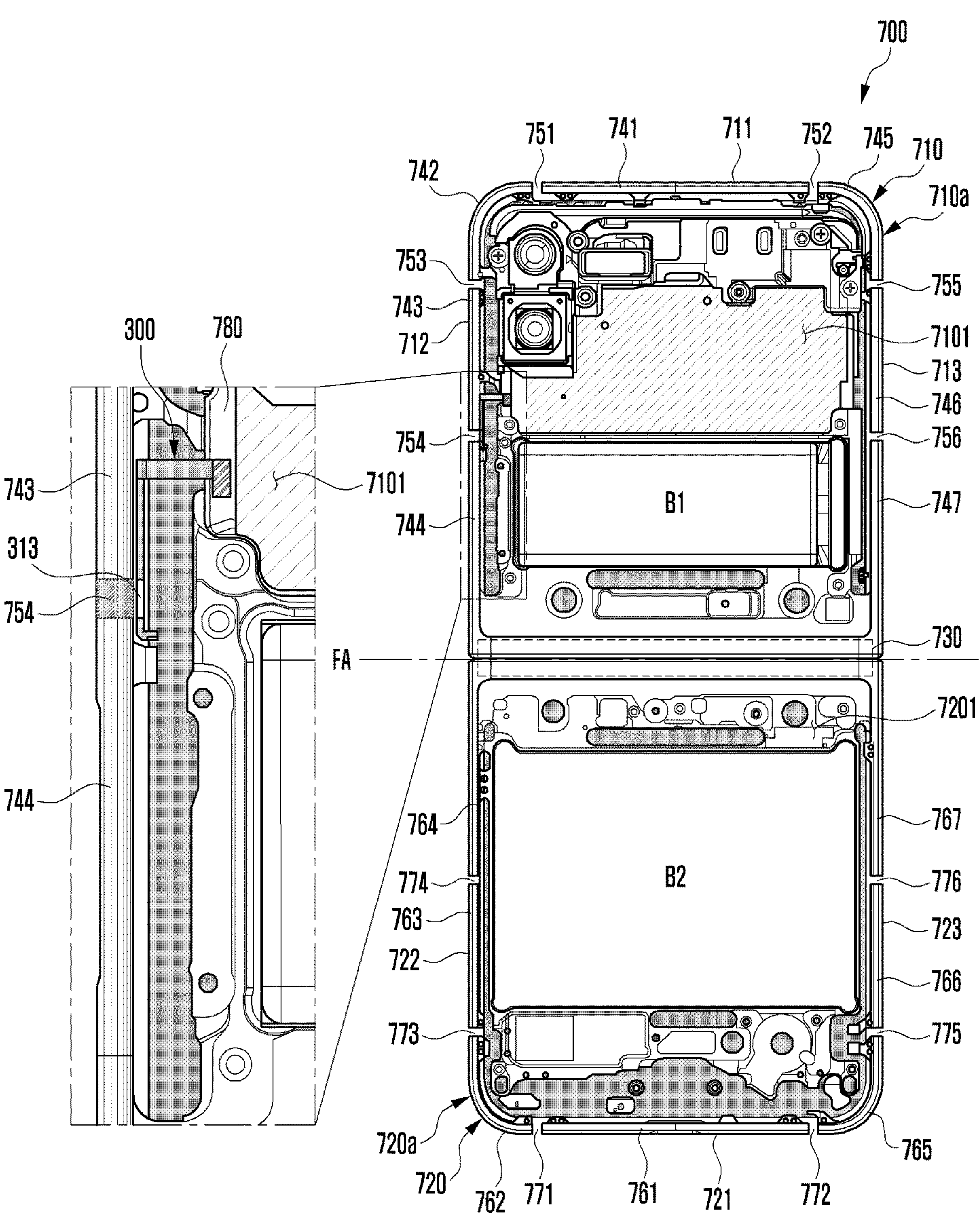
FIG. 16 is a diagram illustrating an electronic device including a connection circuit board according to various embodiments.

FIG. 16 is a diagram illustrating an example electronic device including a connection circuit board according to various embodiments.

The electronic device 700 of FIG. 16 may be at least partially similar to the electronic device 100 of FIG. 1 or may further include various embodiments of the electronic device.

Referring to FIG. 16, the electronic device 700 may include a first housing 710 and a second housing 720 that is foldably coupled to the first housing 710 via a hinge device 730 that allows the device 700 to be folded about folding axis FA. In an embodiment, the electronic device 700 may include a flexible display (not illustrated) that is disposed to be supported by the first housing 710 and the second housing 720 and is bent together in response to a folding operation. In an embodiment, the first housing 710 may include a first side surface member 710*a* including a first side surface 711, a second side surface 712 extending from one end of the first side surface 711 in a direction perpendicular thereto, and a third side surface 713 extending from the other end of the first side surface 711 in a direction perpendicular thereto and in parallel to the second side surface 712. In an embodiment, the second housing 720 may include a second side surface member 720*a* including a fourth side surface 721, a fifth side surface 722 extending from one end of the fourth side surface 721 in a direction perpendicular thereto and disposed on the same line as the second side surface 712, and a sixth side surface 723 extending from the other end of the fourth side surface 721 in a direction perpendicular thereto and disposed on the same line as the third side surface 713. In an embodiment, the first side surface member 710*a* and the second side surface member 720*a* may include a conductive material (e.g., a metal material). In an embodiment, the electronic device 700 may include a first battery B1 disposed in a first space 7101 of the first housing 710 and a second battery B2 disposed in a second space 7201 of the second housing.

According to various embodiments, the first housing 710 may include a first conductive portion 741 disposed on a portion of the first side surface 711 of the first side surface member 710*a*, a second conductive portion 742 disposed on a portion of the first side surface 711 and a portion of the second side surface 712, a third conductive portion 743 disposed on a portion of the second side surface 712, a fourth conductive portion 744 disposed on a portion of the second side surface 712, a fifth conductive portion 745 disposed on a portion of the first side surface 711 and a portion of the third side surface 713, a sixth conductive portion 746 disposed on a portion of the third side surface 713, and/or a seventh conductive portion 747 disposed on a portion of the third side surface 713. In an embodiment, the first housing 710 may include a first non-conductive portion 751 located between the first conductive portion 741 and the second conductive portion 742, a second non-conductive portion 752 located between the first conductive portion 741 and the fifth conductive portion 745, a third non-conductive portion 753 located between the second conductive portion 742 and the third conductive portion 743, a fourth non-conductive portion 754 located between the third conductive portion 743 and the fourth conductive portion 754, a fifth non-conductive portion 755 located between the fifth conductive portion 745 and the sixth conductive portion 746, and/or a sixth non-conductive portion 756 located between the sixth conductive portion 746 and the seventh conductive portion 747.

According to various embodiments, the second housing 720 may include an eighth conductive portion 761 disposed on a portion of the fourth side surface 721 of the second side surface member 720*a*, a ninth conductive portion 762 disposed on a portion of the fourth side surface 721 and a portion of the fifth side surface 722, a tenth conductive portion 763 disposed on a portion of the fifth side surface 722, an eleventh conductive portion 764 disposed on a portion of the fifth side surface 722, a twelfth conductive portion 765 disposed on a portion of the fourth side surface 721 and a portion of the sixth side surface 723, a thirteenth conductive portion 766 disposed on a portion of the sixth side surface 723, and/or a fourteenth conductive portion 767 disposed on a portion of the sixth side surface 723. In an embodiment, the second housing 720 may include a seventh non-conductive portion 771 located between the eighth conductive portion 761 and the ninth conductive portion 762, an eighth non-conductive portion 772 located between the eighth conductive portion 761 and the twelfth conductive portion 765, a ninth non-conductive portion 773 located between the ninth conductive portion 762 and the tenth conductive portion 763, a tenth non-conductive portion 774 located between the tenth conductive portion 763 and the eleventh conductive portion 764, a eleventh non-conductive portion 775 located between the twelfth conductive portion 765 and the thirteenth conductive portion 766, and/or a twelfth non-conductive portion 776 located between the thirteenth conductive portion 766 and the fourteenth conductive portion 767. In an embodiment, the first non-conductive portion 751, the second non-conductive portion 752, the third non-conductive portion 753, the fourth non-conductive portion 754, the fifth non-conductive portion 755, and the sixth non-conductive portion 756 provided in the first housing 710 may be disposed at positions respectively corresponding to the seventh non-conductive portion 771, the eighth non-conductive portion 772, the ninth non-conductive portion 773, the tenth non-conductive portion 774, the eleventh non-conductive portion 775, and the twelfth non-conductive portion 776 provided in the second housing 720 when the electronic device 700 is in the folded state.

According to various embodiments, the electronic device 600 may include a connection circuit board 300 connecting a wireless communication circuit (e.g., the wireless communication module 192 in FIG. 1) disposed on a circuit board 780 disposed in the first space 7101 of the first housing 710 to the fourth conductive portion 744. In an embodiment, the connection circuit board 300 may have substantially the same arrangement structure as the connection circuit board 300 in FIGS. 5A to 5C. In an embodiment, the wireless communication circuit (e.g., the wireless communication module 192 in FIG. 1) may be configured to transmit or receive an RF signal in a predetermined frequency band via the fourth conductive portion 744. In this case, the connection circuit board 300 may include a non-conductive area 313. In an embodiment, the connection circuit board 300 may have a non-conductive area 313 disposed to correspond to the fourth non-conductive portion 754. In various embodiments, the wireless communication circuit (e.g., the wireless communication module 192 in FIG. 1) may be configured to transmit or receive an RF signal via at least one of the first conductive portion 741, the second conductive portion 742, the third conductive portion 743, the fifth conductive portion 745, the sixth conductive part 746, or the seventh conductive portion 747.

According to an example embodiment of the disclosure, the conductive portion 744 of the side surface member 710*a*, which is difficult to use as a radiator, may be used as an antenna with improved radiation performance when the conductive portion 744 is electrically connected to the wireless communication circuit (e.g., the wireless communication module 192 in FIG. 1) via the connection circuit board 300 and the non-conductive area 313 of the connection circuit board 300 is located to correspond to the non-conductive portion 754.

According to various example embodiments, an electronic device may include a housing comprising a conductive portion (e.g., the first conductive portion 2111 in FIG. 2A) and non-conductive portion (e.g., the first non-conductive portion 2113 in FIG. 2A) forming a portion of an exterior side surface, a circuit board disposed in the housing, a communication circuit (e.g., the wireless communication circuit 2711 in FIG. 8) disposed on the circuit board, and a connection circuit board (e.g., the connection circuit board 300 in FIG. 5B) electrically connecting the communication circuit to the conductive portion in the inner space, wherein the connection circuit board may comprise a conductive area (e.g., the conductive area 312 in FIG. 5B) and non-conductive area (e.g., the non-conductive area 313 in FIG. 5B), the non-conductive area being located within a proximity of the non-conductive portion, and the communication circuit may be configured to transmit or receive signals via the conductive portion.

According to various example embodiments, the non-conductive area may at least partially overlap the at least one non-conductive portion when the non-conductive portion is viewed from the outside.

According to various example embodiments, the non-conductive area may be configured to induce a current distribution near the non-conductive portion when the conductive portion operates as an antenna.

According to various example embodiments, the non-conductive area may have a width (e.g., the width w4 in FIG. 5C) of 5 mm or more in a longitudinal direction of the connection circuit board and a depth (e.g., the depth h in FIG. 5C) of 1 mm or more.

According to various example embodiments, the connection circuit board may be disposed to have a separation distance (e.g., the separation distance d1 in FIG. 5A) within 5 mm of the conductive portion.

According to various example embodiments, the connection circuit board may be disposed such that the non-conductive area has a shortest distance within 3 mm from the non-conductive portion.

According to various example embodiments, the non-conductive portion (e.g., the non-conductive portion 4113 in FIG. 10B) may comprise polymer, and the connection circuit board may be disposed such that a portion corresponding to the non-conductive area is supported by the polymer protruding from the non-conductive portion.

According to various example embodiments, the connection circuit board comprises a first surface and a second surface opposite to the first surface, and wherein the connection circuit board is disposed in the housing such that the first surface thereof dace an inner surface of the exterior side surface.

According to various example embodiments, the electronic device may include an external housing (e.g., the external housing 420 in FIG. 12C) surrounding at least a portion of the housing (e.g., the housing 410 in FIG. 12C) and including an external non-conductive portion (e.g., the external non-conductive portion 4213 in FIG. 12C), and the external non-conductive portion may be provided at a position corresponding to the non-conductive portion.

According to various example embodiments, the connection circuit board may include an extension (e.g., the extension 301 in FIG. 12A), a first connection portion (e.g., the first connection portion 302 in FIG. 12A) disposed at one end of the extension, and a second connection portion (e.g., the second connection portion 303 in FIG. 12A) disposed at an other end of the extension, wherein the first connection portion may be electrically connected to a circuit board (e.g., the circuit board 510 in FIG. 12A) disposed in the housing.

According to various example embodiments, the second connection portion may be electrically connected to the conductive portion.

According to various example embodiments, the second connection portion may be electrically connected to a sub-circuit board (e.g., the sub-circuit board 520 in FIG. 12A) spaced apart from the circuit board, and at least a portion of the extension may be electrically connected to the conductive portion.

According to various example embodiments, the second connection portion may be electrically connected to a conductive structure (e.g., the electrical structure 520 in FIG. 12A) disposed in the housing, and at least a portion of the extension may be electrically connected to the conductive portion.

According to various example embodiments, the conductive structure may include at least one of a metal bracket, a shield can, or a ground of a sub-circuit board disposed in the housing.

According to various example embodiments, the conductive portion may include a first conductive portion (e.g., the first conductive portion 4111 in FIG. 12B) and a second conductive portion (e.g., the second conductive portion 4112 in FIG. 12B) split by the non-conductive portion (e.g., the first non-conductive portion 4113 in FIG. 12B), a portion of the extension may be electrically connected to the first conductive portion, and another portion of the extension may be electrically connected to the second conductive portion.

According to various example embodiments, the non-conductive portion may include a first non-conductive portion (e.g., the first non-conductive portion 4113 in FIG. 12D) and a second non-conductive portion (e.g., the second non-conductive portion 4115 in FIG. 12D) spaced apart on the exterior side surface, and the conductive portion (e.g., the first conductive portion 4111 in FIG. 12D) may be disposed between the first non-conductive portion and the second non-conductive portion.

According to various example embodiments, the extension may be electrically connected to the conductive portion (e.g., the first conductive portion 4111 in FIG. 12E) at a first feeding point (e.g., the first feeding point F1 in FIG. 12E) and a second feeding point (e.g., the second feeding point F2 in FIG. 12E) spaced apart from the first feeding point, and a third point (e.g., the third point G1 in FIG. 12E) of the conductive portion between the first feeding point and the second feeding point may be electrically connected to the conductive area of the connection circuit board.

According to various example embodiments, the housing may include a first housing (e.g., the housing 210 in FIG. 2A), and a second housing (e.g., the slide structure 250 in FIG. 2A) slidably coupled to the first housing, wherein the conductive portion may be disposed on at least a portion of a side surface of the first housing.

According to various example embodiments, the second housing may include another non-conductive portion disposed at a position corresponding to the non-conductive portion in a slide-in state.

According to various example embodiments, the housing may include a first housing (e.g., the first housing 710 in FIG. 16), and a second housing (e.g., the second housing 720 in FIG. 16) foldably coupled to the first housing via a hinge device (e.g., the hinge device 730 in FIG. 16), wherein the conductive portion (e.g., the fourth conductive portion 744 in FIG. 16) may be disposed on at least a portion of a side surface of the first housing and/or the second housing.

The various example embodiments of the disclosure and drawings are provided merely to illustrate various examples, and are not intended to limit the scope of the disclosure. Accordingly, the scope of the disclosure is to be understood in such a manner that, in addition to the various example embodiments disclosed herein, all changes or modifications derived from the technical idea of the disclosure, including the appended claims are included in the scope of the disclosure. It will also be understood that any of the embodiment(s) described herein may be used in conjunction with any other embodiment(s) described herein.

What is claimed is:

1. An electronic device comprising:

a housing comprising a conductive portion and a non-conductive portion connected to the conductive portion, the conductive portion and the non-conductive portion forming a portion of an exterior side surface, the conductive portion operating as an antenna;

a circuit board disposed in the housing;

a communication circuit disposed on the circuit board; and a connection circuit board electrically connecting the communication circuit to the conductive portion, wherein the connection circuit board comprises a first layer including a conductive area and a non-conductive area, the non-conductive area being located within a proximity of the non-conductive portion, wherein when the exterior side surface is viewed from outside of the electronic device, the non-conductive area of the connection circuit board at least partially overlaps the non-conductive portion of the housing, and wherein the communication circuit is configured to transmit or receive signals via the conductive portion.

2. The electronic device of claim 1, wherein the non-conductive area has a width of 5 mm or more in a longitudinal direction of the connection circuit board and a depth of 1 mm or more.

3. The electronic device of claim 1, wherein the connection circuit board is disposed to have a separation distance within 5 mm of the conductive portion.

4. The electronic device of claim 1, wherein the non-conductive portion comprises a polymer, and wherein the connection circuit board is disposed such that a portion corresponding to the non-conductive area is supported by the polymer protruding from the non-conductive portion.

5. The electronic device of claim 1, wherein the connection circuit board comprises a first surface and a second surface opposite to the first surface, and wherein the connection circuit board is disposed in the housing such that the first surface thereof faces an inner surface of the exterior side surface.

6. The electronic device of claim 1, further comprising an external housing surrounding at least a portion of the housing and comprising an external non-conductive portion, wherein the external non-conductive portion is provided at a position corresponding to the non-conductive portion.

7. The electronic device of claim 1, wherein the connection circuit board comprises:

an extension;

a first connection portion disposed at one end of the extension; and a second connection portion disposed at another end of the extension, and wherein the first connection portion is electrically connected to a circuit board disposed in the housing.

8. The electronic device of claim 7, wherein the second connection portion is electrically connected to the conductive portion.

9. The electronic device of claim 7, wherein the second connection portion is electrically connected to a sub-circuit board spaced apart from the circuit board, and wherein at least a portion of the extension is electrically connected to the conductive portion.

10. The electronic device of claim 7, wherein the second connection portion is electrically connected to a conductive structure disposed in the housing, and wherein at least a portion of the extension is electrically connected to the conductive portion.

11. The electronic device of claim 10, wherein the conductive structure comprises at least one of a metal bracket, a shield can, or a ground of a sub-circuit board disposed in the housing.

12. The electronic device of claim 7, wherein the conductive portion comprises a first conductive portion and a second conductive portion split by the non-conductive portion, wherein a portion of the extension is electrically connected to the first conductive portion, and wherein another portion of the extension is electrically connected to the second conductive portion.

13. The electronic device of claim 7, wherein the non-conductive portion comprises a first non-conductive portion and a second non-conductive portion spaced apart on the exterior side surface, and wherein the conductive portion is disposed between the first non-conductive portion and the second non-conductive portion.

14. The electronic device of claim 13, wherein the extension is electrically connected to the conductive portion at a first feeding point and a second feeding point spaced apart from the first feeding point, and wherein a third point of the conductive portion between the first feeding point and the second feeding point is electrically connected to the conductive area of the connection circuit board.

15. The electronic device of claim 1, wherein the housing comprises:

a first housing; and a second housing slidably coupled to the first housing, and wherein the conductive portion is disposed on at least a portion of a side surface of the first housing.

16. The electronic device of claim 15, wherein the second housing comprises another non-conductive portion disposed at a position corresponding to the non-conductive portion in a slide-in state of the first and second housings.

17. The electronic device of claim 1, wherein the housing comprises:

a first housing; and a second housing foldably coupled to the first housing via a hinge device, and wherein the conductive portion is disposed on at least a portion of a side surface of one or both of the first housing and the second housing.

18. The electronic device of claim 1, wherein the non-conductive area is configured to induce a current distribution near the non-conductive portion when the conductive portion operates as the antenna.

* * * * *